(12) United States Patent
Miyazaki et al.

(10) Patent No.: US 8,134,773 B2
(45) Date of Patent: Mar. 13, 2012

(54) DISPLAY DEVICE AND DISPLAY METHOD

(75) Inventors: Takashi Miyazaki, Kanagawa-ken (JP);
Rei Hasegawa, Kanagawa-ken (JP);
Hajime Yamaguchi, Kanagawa-ken (JP); Hitoshi Nagato, Tokyo (JP);
Haruhi Oooka, Kanagawa-ken (JP);
Shuichi Uchikoga, London (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 12/705,035

(22) Filed: Feb. 12, 2010

(65) Prior Publication Data

US 2010/0208332 A1 Aug. 19, 2010

(30) Foreign Application Priority Data

Feb. 10, 2009 (JP) ................. 2009-028919

(51) Int. Cl.
*G02F 1/29* (2006.01)
(52) U.S. Cl. ...................................... 359/315
(58) Field of Classification Search .......... 359/315–318, 359/245, 265–275
See application file for complete search history.

(56) References Cited

U.S. PATENT DOCUMENTS 7,820,908 B2 * 10/2010 Kang et al. ............... 136/263

FOREIGN PATENT DOCUMENTS

| JP | 2003-107441 | 4/2003 |
| JP | 2006-349768 | 12/2006 |
| JP | 2007-240668 | 9/2007 |

* cited by examiner

*Primary Examiner* — Ricky Mack
*Assistant Examiner* — Tuyen Tra
(74) *Attorney, Agent, or Firm* — Oblon, Spivak, McClelland, Maier & Neustadt, L.L.P.

(57) ABSTRACT

A display device includes: an optical cell including: a first electrode; a second electrode; an ion conduction layer facing the first electrode and the second electrode and containing a mobile ion; and a first nanostructure provided between the first electrode and the ion conduction layer and being electrically connected to the first electrode. The first nanostructure has a first plasmon resonance wavelength in a visible light region and contains a first metal element. A first metal compound layer which contains the first metal element contained in the first nanostructure and has a refractive index different from a refractive index of the ion conduction layer is formed on at least a part of a surface of the first nanostructure by applying a voltage between the first electrode and the second electrode. An amount of the first metal compound layer is different between in a first state in which a first voltage is applied between the first electrode and the second electrode and in a second state in which a second voltage different from the first voltage is applied between the first electrode and the second electrode.

20 Claims, 26 Drawing Sheets

VA=V1

VA=V2

DISPLAY DEVICE AND DISPLAY METHOD

CROSS-REFERENCE TO RELATED APPLICATIONS

This application is based upon and claims the benefit of priority from the prior Japanese Patent Application No. 2009-028919, filed on Feb. 10, 2009; the entire contents of which are incorporated herein by reference.

BACKGROUND OF THE INVENTION

1. Field of the Invention

The invention relates to a display device and a display method.

2. Background Art

Among non-luminous display devices, there is a display device that combines a color filter that absorbs light of a specific wavelength and a light switch layer of liquid crystal and the like. In such a display device using a color filter, since the light of the specific wavelength is continually absorbed, the device has low light use efficiency and limitations on obtaining bright display. In particular, this low light use efficiency is a serious problem in the case of reflection-type display devices that do not use a specific light source such as a backlight.

A display device in which the wavelength of light to be absorbed can be controlled by, for example, an electric signal is expected to achieve display without using a color filter. For example, by using a localized surface plasmon which can be excited with visible light, the resonance wavelength can be shifted by an electric signal from the outside to control the wavelength of the light to be absorbed, and thereby colors of the entire visible region can be displayed.

For example, a display device is presented that deposits particles of a metal ion by an applied electric field and thereby generates plasmon absorption (see JP-A 2007-240668 (Kokai), for example). Further, an image formation means is presented in which particles having plasmon color-developing capability which take charge in different polarity are moved by an applied electric field (see JP-A 2006-349768 (Kokai), for example). However, these methods require large energy to deposit or move particles, and further have a problem with a response speed.

Further, a display device is presented that combines: a color separation optical element such as a prism and a diffraction grating; a refractive index changing layer; and a plasmon-generated light emitting means (see JP-A 2003-107441 (Kokai), for example). However, this method requires the color separation optical element, and therefore has a complicated configuration.

On the other hand, it is reported that, if a metal nanoparticle is immersed in a solution containing an anion and electrophoresis is performed by an applied voltage to adhere the anion to the metal nanoparticle, a resonance wavelength of a localized surface plasmon of the metal nanoparticle shifts (see J. Electrochem. Soc. 146, p 628 (1999), for example). However, according to this method, the shift amount of the resonance wavelength is approximately 10 nm (nanometers) at most, which is insufficient to be used for a display device.

SUMMARY OF THE INVENTION

According to an aspect of the invention, there is provided a display device including: an optical cell including: a first electrode; a second electrode; an ion conduction layer facing the first electrode and the second electrode and containing a mobile ion; and a first nanostructure provided between the first electrode and the ion conduction layer, the first nanostructure being electrically connected to the first electrode, having a first plasmon resonance wavelength in a visible light region, and containing a first metal element, a first metal compound layer containing the first metal element contained in the first nanostructure and having a refractive index different from a refractive index of the ion conduction layer, the first metal compound layer being formed on at least a part of a surface of the first nanostructure by applying a voltage between the first electrode and the second electrode, and an amount of the first metal compound layer being different between in a first state and in a second state, a first voltage being applied between the first electrode and the second electrode in the first state, a second voltage different from the first voltage being applied between the first electrode and the second electrode in the second state.

According to another aspect of the invention, there is provided a display method including: changing an amount of a metal compound layer formed on at least a part of a surface of a nanostructure by changing a voltage applied between a first electrode and a second electrode of an optical cell, the optical cell including: the first electrode; the second electrode; an ion conduction layer facing the first electrode and the second electrode and containing a mobile ion; and the nanostructure provided between the first electrode and the ion conduction layer, electrically connected to the first electrode, the nanostructure having a plasmon resonance wavelength in a visible light region, and containing a metal element, the metal compound layer being formed by applying the voltage between the first electrode and the second electrode, the metal compound layer containing the metal element contained in the nanostructure, and having a refractive index different from a refractive index of the ion conduction layer.

DETAILED DESCRIPTION OF THE INVENTION

Embodiments of the invention will now be described with reference to the drawings.

The drawings are schematic or conceptual; and the relationships between the thickness and width of portions, the proportions of sizes among portions, and the like are not necessarily the same as the actual values thereof. Further, the dimensions and proportions may be illustrated differently among drawings, even for identical portions.

In the specification and drawings of the application, components similar to those described in regard to a drawing thereinabove are marked with the same reference signs, and a detailed description is omitted as appropriate.

(First Embodiment)

Figure 1:
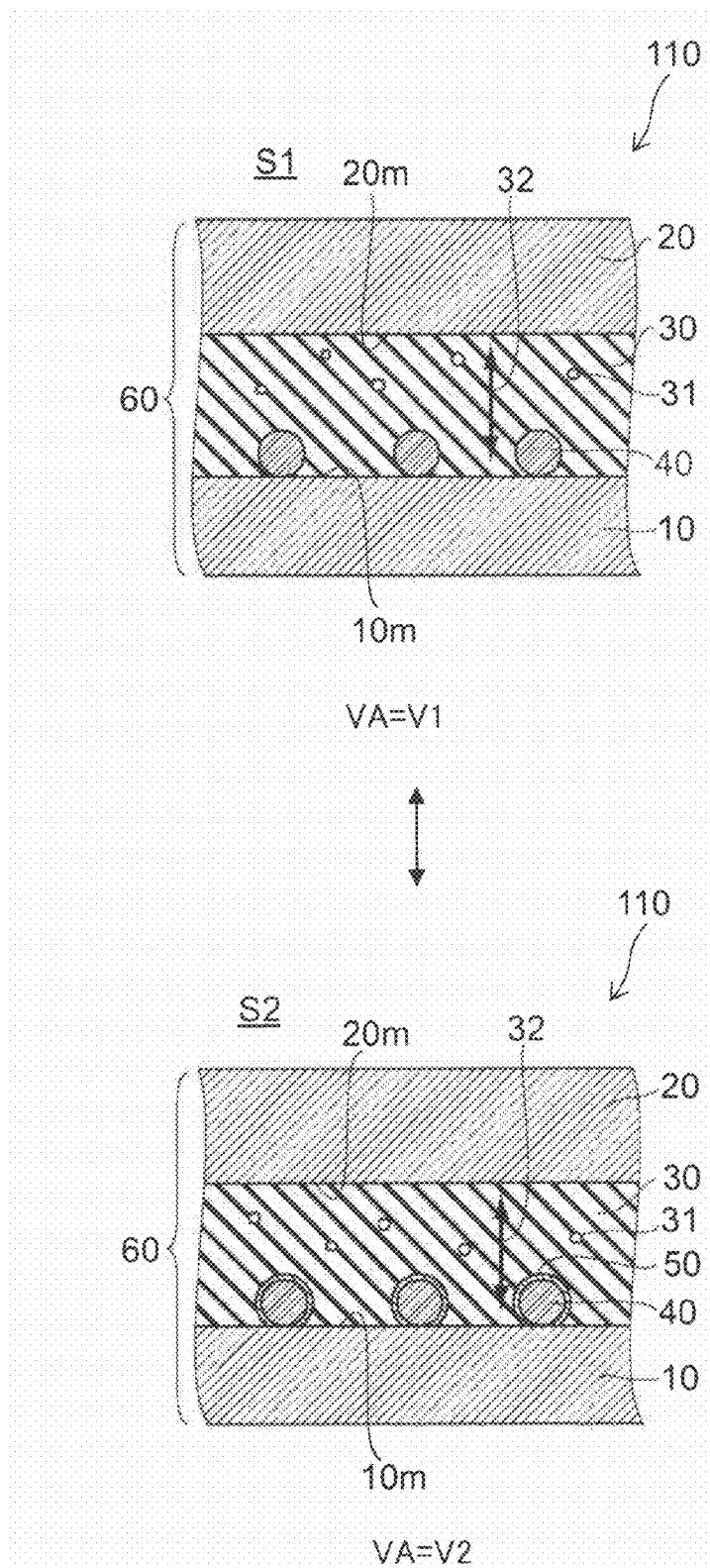
FIG. 1 is a schematic cross-sectional view illustrating a configuration of a display device according to a first embodiment of the invention.

FIG. 1 is a schematic cross-sectional view illustrating configuration of a display device according to a first embodiment of the invention.

The drawing illustrates a first state S1 and a second state S2 of this display device.

As illustrated in FIG. 1, the display device 110 according to the first embodiment of the invention includes an optical cell 60.

The optical cell includes a first electrode 10, a second electrode 20, an ion conduction layer 30, and a nanostructure 40 (first nanostructure).

The first electrode 10 and the second electrode 20 are mutually exchangeable.

Disposition of the first electrode 10 and the second electrode 20 is optional.

In this specific example, the second electrode 20 is provided on the opposite side of the ion conduction layer 30 to the side facing the first electrode 10. That is, the first electrode 10 is provided on one major surface of the ion conduction layer 30, and the second electrode 20 is provided on the other major surface thereof. Further, the first electrode 10 and the second electrode 20 are provided facing each other.

The invention is not limited thereto, but the first electrode 10 and the second electrode 20 may not face each other. Modification examples of the disposition of the first electrode 10 and the second electrode 20 will be described later.

The ion conduction layer 30 faces the first electrode 10 and the second electrode 20.

That is, in this specific example, a first major surface $10m$ of the first electrode 10 and a second major surface $20m$ of the second electrode 20 face each other, and the ion conduction layer 30 is provided so as to be placed between the first electrode 10 and the second electrode 20. At this time, a current path 32 is formed in a direction perpendicular to the first major surface $10m$ and the second major surface $20m$. The ion conduction layer 30 forms the current path 32.

The ion conduction layer 30 contains a mobile ion 31. The mobile ion 31 is provided in order to pass a current between the first electrode 10 and the second electrode 20, and may be made of an optional material. The mobile ion 31 will be described later.

The nanostructure 40 is connected to the first electrode 10. However, the nanostructure 40 may be electrically connected to at least one of the first electrode 10 and the second electrode 20. In this specific example, the nanostructure 40 is provided on the first electrode 10 and electrically connected to the first electrode 10.

The nanostructure 40 is provided between the first electrode 10 and the ion conduction layer 30. However, the nanostructure 40 may be provided between the ion conduction layer 30 and at least one of the first electrode 10 and the second electrode 20 to which the nanostructure 40 is electrically connected. That is, at least part of a surface of the nanostructure 40 is in contact with the ion conduction layer 30 in one of the first state S1 and the second state S2.

The nanostructure 40 contains a metal element (first metal element), and has a plasmon resonance wavelength in a visible region. For example, the nanostructure 40 is made of gold, for example, and is a particle having a particle diameter of approximately 20 nm (nanometers) or more and 100 nm or less, for example. Thereby, the nanostructure 40 has the plasmon resonance wavelength.

The metal element used for the nanostructure 40 and a shape and size of the nanostructure 40 will be described later.

In the optical cell 60 of a configuration like this, a voltage (applied voltage VA) applied between the first electrode 10 and the second electrode 20 is variable.

For example, the optical cell 60 has the first state S1 in which a first voltage V1 is applied between the first electrode 10 and the second electrode 20. Further, the optical cell 60 has the second state S2 in which a second voltage V2 is applied between the first electrode 10 and the second electrode 20. The second voltage V2 is a voltage different from the first voltage V1. That is, at least one of an absolute value of the voltage and polarity of the voltage of the second voltage V2 is different from that of the first voltage V1.

In the following, electric potential of the first electrode 10 when electric potential of the second electrode 20 is defined as a reference is defined as the applied voltage VA between the first electrode 10 and the second electrode 20.

In the optical cell 60, a metal compound layer 50 (first metal compound layer) is formed on at least part of the surface of the nanostructure 40 by applying the applied voltage VA. In this specific example, the metal compound layer 50 is formed in the second state S2 in which the second voltage V2 is applied.

The metal compound layer 50 includes a metal compound (first metal compound) containing the metal element contained in the nanostructure 40. For example, in the case where the nanostructure 40 is the particle of gold, the metal compound layer 50 is a compound of gold. For example, the metal compound layer 50 is an oxide of gold.

A refractive index n1 of the metal compound layer 50 is different from a refractive index n0 of the ion conduction layer 30.

This metal compound layer 50 is formed by an electrochemical reaction, for example, which is generated by the current passed by the applied voltage VA applied between the first electrode 10 and the second electrode 20. Therefore, the amount of the metal compound layer 50 changes with at least one of the polarity and the magnitude of the applied voltage VA.

That is, the amount of the metal compound layer 50 is different between in the first state S1 and in the second state S2.

Thereby, a refractive index (for example, an average refractive index) of surroundings of the nanostructure 40 changes between in the first state S1 and in the second state S2. Thereby, the plasmon resonance wavelength of the nanostructure 40 changes and consequently an absorption wavelength of the optical cell 60 changes.

For example, the first voltage V1 is assumed to be 0 V, and the second voltage V2 is assumed to be 5 V.

At this time, as illustrated in FIG. 1, in the first state S1 in which the applied voltage VA is 0 V, the metal compound layer 50 is not formed. Further, in the second state S2 in which the applied voltage VA is 5 V, the metal compound layer 50 is formed on the surface of the nanostructure 40.

At this time, in the first state S1, since the surface of the nanostructure 40 is covered with the ion conduction layer 30, the refractive index of the surroundings of the nanostructure 40 is n0. In the case where the entire surface of the nanostructure 40 is covered with the metal compound layer 50 in the second state S2, the refractive index of the surroundings of the nanostructure 40 is n1.

Since the plasmon resonance wavelength of the nanostructure 40 changes with the refractive index of the surroundings thereof, a plasmon resonance frequency changes with a change in the refractive index of the surroundings, and consequently the absorption wavelength at the optical cell 60 changes.

For example, since the amount of the metal compound layer 50 can be controlled by the applied voltage VA, consequently the plasmon resonance frequency can be controlled and the absorption wavelength at the optical cell 60 can be controlled.

The metal compound layer 50 is provided on at least part of the nanostructure 40 and has an optional shape and a thickness, and various kinds of modifications to the shape and the thickness are possible.

In the display device 110 according to this embodiment, since the metal compound layer 50 is directly formed on the surface of the nanostructure 40, a change in the plasmon resonance frequency is great. For example, in the case of a comparative example as described in J. Electrochem. Soc. 146, p 628 (1999), in which an anion is adhered to the surface of the nanostructure, a space is created microscopically between the metal atom of the nanostructure and the anion. Accordingly, in this comparative example, the change in the plasmon resonance frequency is small. In contrast, in the display device 110 according to this embodiment, the change in the plasmon resonance frequency can be expanded because: the metal compound layer 50 is directly formed on the surface of the nanostructure 40; the metal compound layer 50 is disposed adjacent to the metal atom of the nanostructure 40; and effects of the change in the refractive index are utilized efficiently.

Figure 2:
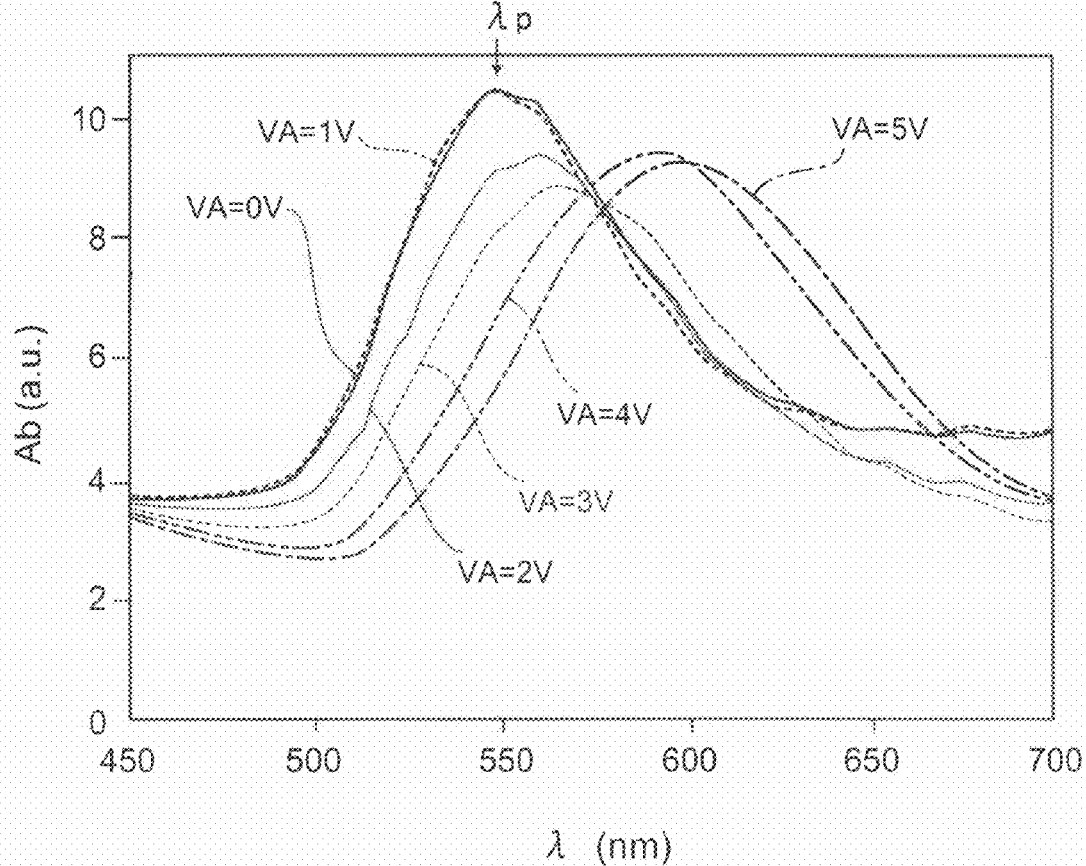
FIG. 2 is a graph illustrating characteristics of the display device according to the first embodiment of the invention.

FIG. 2 is a graph illustrating characteristics of the display device according to the first embodiment of the invention.

That is, the drawing illustrates results of absorption spectrum measurement while changing the applied voltage VA in the display device 110. The horizontal axis represents a wavelength $\lambda$, and the vertical axis represents an absorbance Ab on an arbitrary scale.

In regard to a sample used for the measurement, ITO (indium tin oxide) was used as the first electrode 10 and the second electrode 20, and a particle made of gold with a diameter of approximately 40 nm was used for the nanostructure 40. The nanostructure 40 is provided on the first electrode 10. An aqueous solution in which citric acid is dissolved at 0.02 μg/ml was used as the ion conduction layer 30. That is, the mobile ion 31 is citric acid. Then, the applied voltage VA between the first electrode 10 and the second electrode 20 was changed from 0 V to 5 V to measure spectral characteristics of the display device 110.

As illustrated in FIG. 2, when the applied voltage VA is 0 V, a wavelength of an absorption peak $\lambda p$ of the absorbance Ab is approximately 545 nm. When the applied voltage VA is risen to 2 V or higher, the wavelength of the absorption peak $\lambda p$ rises. For example, when the applied voltage VA is 5 V, the wavelength of the absorption peak $\lambda p$ is approximately 600 nm.

Figure 3:
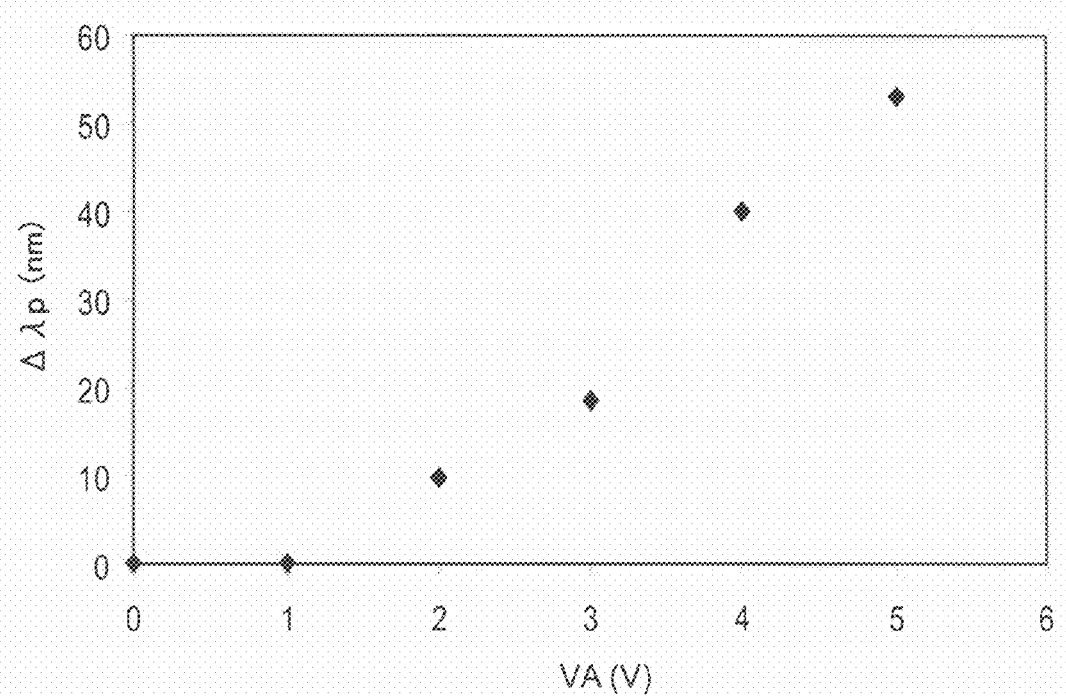
FIG. 3 is a graph illustrating characteristics of the display device according to the first embodiment of the invention.

FIG. 3 is a graph illustrating characteristics of the display device according to the first embodiment of the invention.

That is, the drawing expresses applied voltage VA dependence of a shift amount $\Delta\lambda p$ of the absorption peak. The horizontal axis of the drawing represents the applied voltage VA, and the vertical axis represents the shift amount $\Delta\lambda p$. Here, the shift amount $\Delta\lambda p$ is a shift amount when the wavelength of the absorption peak $\lambda p$ is defined as a reference under the applied voltage of 0V.

As illustrated in FIG. 3, the shift amount $\Delta\lambda p$ of the absorption peak increases as the applied voltage VA increases. The shift amount $\Delta\lambda p$ was 55 nm when the applied voltage VA was 5 V.

Thus, in the display device 110, the wavelength of the absorption peak can be shifted within a range of 55 nm. For example, a larger wavelength shift can be achieved than 10 nm in the method described in J. Electrochem. Soc. 146, p 628 (1999). The display device 110 can expand the shift amount of the plasmon resonance wavelength, enabling to provide a practical display device.

The inventors presumed based on the various analysis results described below that this wavelength shift would be caused by the change in the refractive index of the surroundings of the nanostructure 40. The analysis results in regard to the display device 110 will now be described.

Figure 4A:
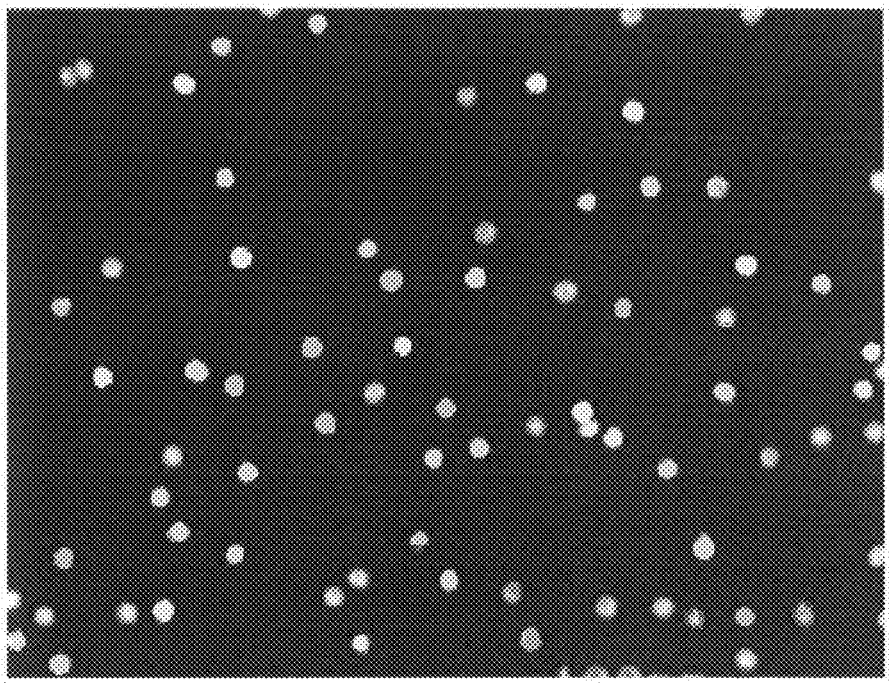
FIGS. 4A and 4B are electron microscope photographs illustrating analysis results on the display device according to the first embodiment of the invention.
Figure 4B:
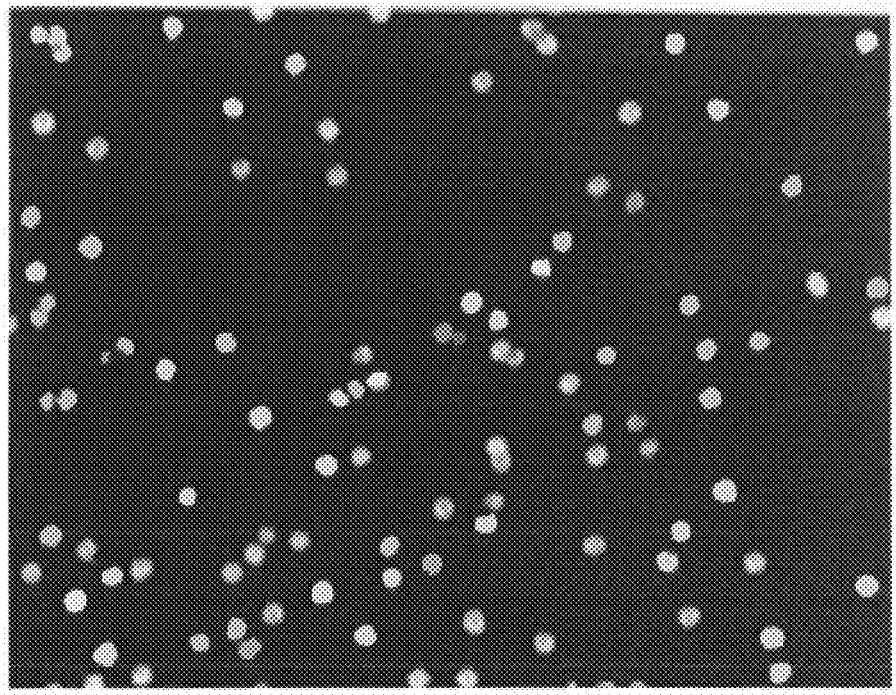

FIGS. 4A and 4B are electron microscope photographs illustrating analysis results on the display device according to the first embodiment of the invention.

That is, FIGS. 4A and 4B illustrate images of the scanning electron microscope photographs of the nanostructures 40 on the first electrode 10. FIG. 4A corresponds to time when the applied voltage VA is 0 V, and FIG. 4B corresponds to time when the applied voltage VA is 5 V. The bright particle-like images in the photographs correspond to the nanostructures 40.

As illustrated in FIGS. 4A and 4B, any of size, shape, and density of the nanostructure 40 does not change between when the applied voltage VA is 0 V and when it is 5 V. Therefore, it was presumed that the shift in the peak wavelength $\lambda p$ due to the applied voltage VA illustrated in FIG. 2 and FIG. 3 would not be caused by any of the size, the shape, and the density of the nanostructure 40 itself but be caused by the change in the refractive index of the surroundings of the nanostructure 40.

Figure 5:
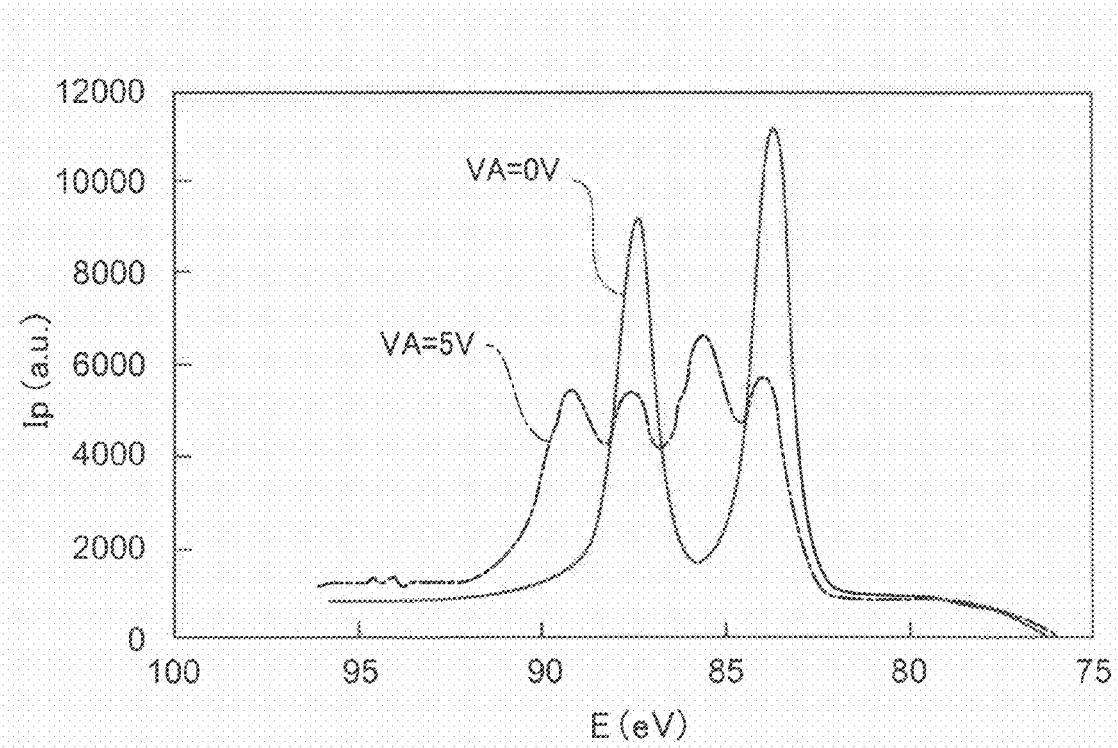
FIG. 5 is a graph illustrating analysis results on the display device according to the first embodiment of the invention.

FIG. 5 is a graph illustrating analysis results on the display device according to the first embodiment of the invention.

That is, the drawing illustrates X-ray photoelectron spectroscopy (XPS) analysis results of the surface of the nanostructure 40 in the display device 110. The horizontal axis represents bond energy E, and the vertical axis represents photoelectron intensity Ip on an arbitrary scale.

As illustrated in FIG. 5, a clear difference was seen between the XPS spectrum when the applied voltage VA was 0 V and the XPS spectrum when the applied voltage VA was 5 V.

That is, when the applied voltage VA was 0 V, characteristics of $Au^0$ contained in the nanostructure 40 were seen, and when the applied voltage VA was 5 V, characteristics of $Au_2O_3$ were seen.

From this, it is concluded that an oxide of gold is formed on the surface of the nanostructure 40 made of gold.

A display device 119 (not illustrated) in which the nanostructure 40 was provided neither on the first electrode 10 nor on the second electrode 20 was fabricated as another comparative example. Other than this, the configuration is similar to the display device 110 according to this embodiment. That is, in the display device 119 of this comparative example, the ion conduction layer 30 made of an aqueous solution of citric acid is provided between the first electrode 10 and the second electrode 20 made of ITO.

The applied voltage VA applied between the first electrode 10 and the second electrode 20, and the current IA flowing at this time were measured in regard to the display device 110 according to this embodiment and the display device 119 of this comparative example.

Figure 6A:
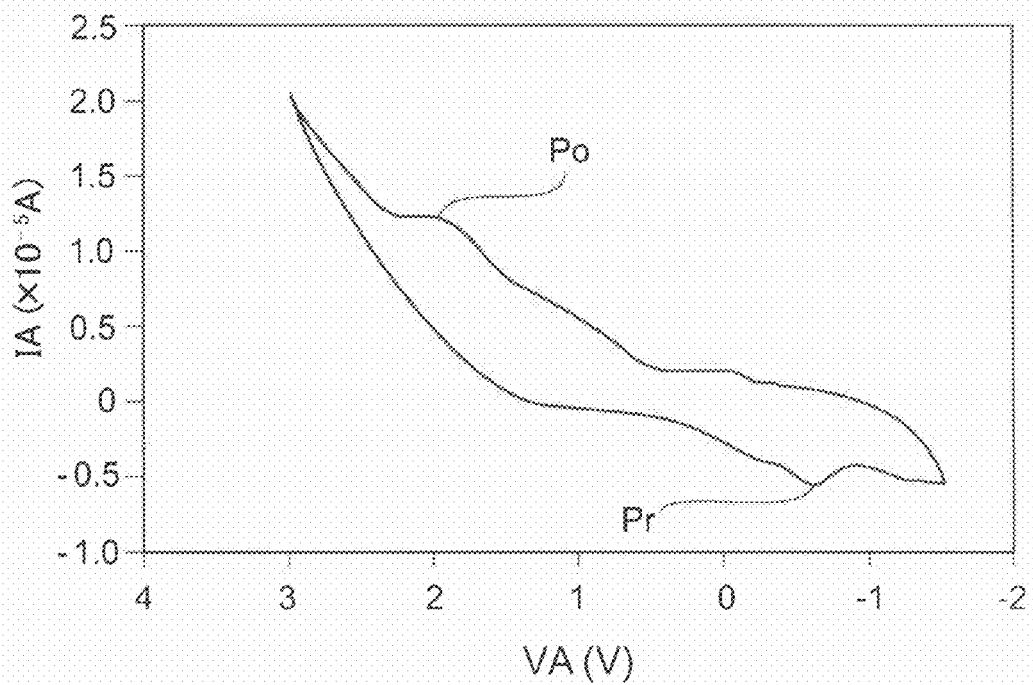
FIGS. 6A and 6B are graphs illustrating characteristics of the display device according to the first embodiment of the invention and the display device of the comparative example.
Figure 6B:
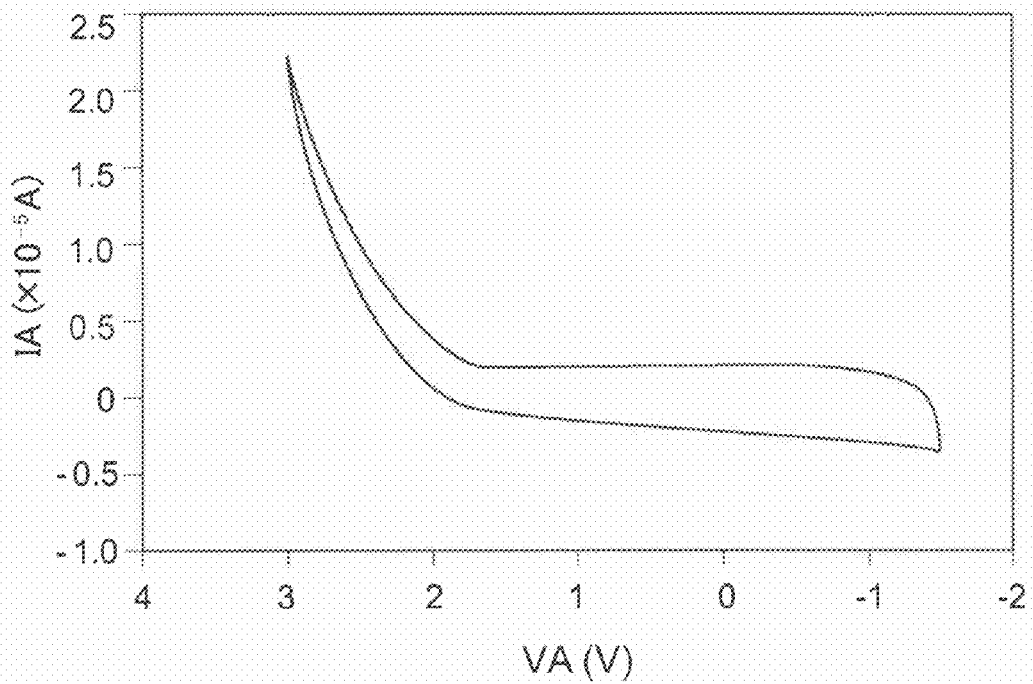

FIGS. 6A and 6B are graphs illustrating characteristics of the display device according to the first embodiment of the invention and the display device of this comparative example.

That is, FIG. 6A illustrates measurement results of the current IA in the display device 110, and FIG. 6B illustrates measurement results of the current IA in the display device 119 of this comparative example.

In the measurement of them, the applied voltage VA was changed within a range of from −1.5 V to +3 V.

As illustrated in FIG. 6B, no distinctive peaks of the current IA are observed in the display device 119 of this comparative example.

In contrast, as illustrated in FIG. 6A, in the display device 110 according to this embodiment, a peak of oxidation Po was observed at an applied voltage VA of approximately +2 V, and a peak of reduction Pr was observed at an applied voltage of approximately −0.6 V.

Therefore, it was presumed that, in the display device 110 according to this embodiment, the electrochemical reaction would have occurred due to the applied voltage VA applied between the first electrode 10 and the second electrode 20, and consequently an oxide of the metal element contained in the nanostructure 40 would have been formed on the surface of the nanostructure 40. This oxide corresponds to the metal compound layer 50 in the display device 110.

The refractive index of the oxide of gold that is the metal compound layer 50 is approximately 1.7 to 3.3, and on the other hand the refractive index of the ion conduction layer 30 that is the aqueous solution of citric acid is 1.33. That is, the refractive index of this metal compound layer 50 is different from the refractive index of the ion conduction layer 30.

The first embodiment of the invention has been achieved based on new knowledge obtained by the above analysis results.

That is, in the display device 110 according to this embodiment, the metal compound layer 50 is formed on at least part of the surface of the nanostructure 40.

Further, the refractive index of the surroundings of the nanostructure 40 changes with the amount of the metal compound layer 50, and thereby the plasmon resonance frequency of the nanostructure 40 changes.

The relationship between the resonance frequency of the nanostructure 40 and the refractive index of the surroundings will now be described.

Theoretical formulae of a resonance wavelength of a localized plasmon will now be described. Here, a localized surface plasmon of an isolated metal particle in a homogeneous medium is taken up. An oscillating electromagnetic field at this time can be completely described by solving Maxwell's equations. Here, retardation based on position is negligible when a particle size is sufficiently smaller than a wavelength of light, and therefore a quasi-electrostatic model holds. In this case, the localized surface plasmon is expressed as polarization that is induced on a surface of a metal fine particle by the oscillating electric field of incident light, and the polarization P can be found from theories about a dielectric in an electrostatic field.

First, in the case where the surrounding medium is a vacuum, if a particle is placed in an optical electric field $E_0$, a dielectric polarization occurs. Assuming that this polarization is uniform in the particle, an internal electric field E in the particle is expressed by a following Mathematical Formula 1.

$$E = E_0 - E_1 \quad (1)$$

Here, $E_1$ represents a depolarization field (in the opposite direction to $E_0$) generated by a surface charge a induced by the optical electric field $E_0$. In the case where the particle has a spheroidal shape (including shapes of a globe, a rod, and a disc), if the polarization is uniform, the depolarization field is also uniform and the relationship between $E_1$ and P is expressed by a following Mathematical Formula 2.

$$E_1 = NP \quad (2)$$

Here, N is referred to as a depolarization field coefficient and takes a value depending on the particle shape (for example, for a globe, $N = 4\pi/3$). Further, assuming that a dielectric susceptibility is $\chi$, the relationship between P and the internal electric field E is expressed by a following Mathematical Formula 3.

$$P = \chi E \quad (3)$$

The relationship between P and $E_0$ becomes a following Mathematical Formula 4 from the Mathematical Formula 1, the Mathematical Formula 2, and the Mathematical Formula 3.

$$P = \frac{\chi}{1 + N\chi} E_0 \quad (4)$$

Then, when the Mathematical Formula 4 is expressed by using a dielectric function $\varepsilon (\varepsilon = 1 + 4\pi\chi)$ of the particle, a following Mathematical Formula 5 is given.

$$P = \frac{\varepsilon - 1}{4\pi + N(\varepsilon - 1)} E_0 \quad (5)$$

Next, the case is considered where the surroundings are made of a medium having a dielectric constant of $\varepsilon_1$.

In this case, the surface charges induced by the light irradiation are partly cancelled by the polarization of the surrounding medium. In order to offset this effect, a resonance occurs at a wavelength at which the particle has a greater absolute value of dielectric constant. The polarization in this case is provided by substituting $\varepsilon/\varepsilon_1$ for $\varepsilon$ of the Mathematical Formula 5. Further, according to the Drude model of a free electron in which an attenuation constant $\gamma$ of the particle is approximated to be zero, the dielectric function $\varepsilon$ is expressed by a following Mathematical Formula 6 using a plasma frequency $\omega_p$.

$$\varepsilon = 1 - \frac{\omega_p^2}{\omega^2} \quad (6)$$

Therefore, the polarization P is expressed by a following Mathematical Formula 7.

$$P = \frac{\omega^2 - \omega_p^2 - \varepsilon_1 \omega^2}{(4\pi\varepsilon_1 + N - N\varepsilon_1)\omega^2 - N\omega_p^2} \cdot E_0 \quad (7)$$

When the denominator of this Mathematical Formula 7 is zero, the polarization P becomes infinity. At this time, the energy of the incident light is absorbed most. This state is the resonance of the localized surface plasmon.

Therefore, a resonance frequency $\omega$ is expressed by a following Mathematical Formula 8.

$$\omega = \sqrt{\frac{N}{(4\pi - N)\varepsilon_1 + N}} \, \omega_p \quad (8)$$

Here, the relationship of a following Mathematical Formula 9 holds between $\omega$ and the wavelength $\lambda$, and the relationship of a following Mathematical Formula 10 holds between $\varepsilon_1$ and the refractive index n of the surrounding medium.

$$\omega = 2\pi \frac{c}{\lambda} \quad (9)$$

$$n = \sqrt{\varepsilon_1} \quad (10)$$

From the Mathematical Formula 8, the Mathematical Formula 9, and the Mathematical Formula 10, the resonance wavelength of the localized surface plasmon is expressed by a following Mathematical Formula 11.

$$\lambda = \frac{2\pi c}{\omega_p} \sqrt{\frac{(4\pi - N)n^2 + N}{N}} \quad (11)$$

From the Mathematical Formula 11, it is found out that the resonance wavelength of the localized surface plasmon shifts with a variation in n, N, or $\omega_p$.

Out of these, in regard to the wavelength shift by N, although a large wavelength shift can be expected at aggregation, it is difficult to disperse again nanoparticles once having aggregated and there is a problem with reversibility of the wavelength shift.

Further, in regard to the wavelength shift by $\omega_p$, the charge injected from the electrode tunnels through the electric double layer at the interface between the nanostructure 40 and the ion conduction layer 30 to be discharged into the solution, and thereby the large wavelength shift cannot be expected in principle.

In the display device 110 according to this embodiment, the large shift in the peak wavelength is achieved by electrochemically forming the metal compound layer 50 on the surface of the nanostructure 40.

Experimental results will now be described on the shift of the plasmon resonance wavelength of the nanostructure 40 with the change in the refractive index of the surroundings of the nanostructure 40.

The nanostructures 40 made of gold particles with diameters of approximately 40 nm provided on the first electrode 10 are surrounded by air, water, ethylene glycol, or liquid crystal. The wavelength dependence of the light scattering characteristics of the nanostructure 40 at this time was measured. Further, photomicrographs of the nanostructures 40 at this time were taken.

That is, in this experiment, the surroundings of the nanostructure 40 are changed among air with a refractive index n of 1, water with a refractive index n of 1.33, ethylene glycol with a refractive index n of 1.43, and liquid crystal with a refractive index n of 1.6.

Figure 7A:
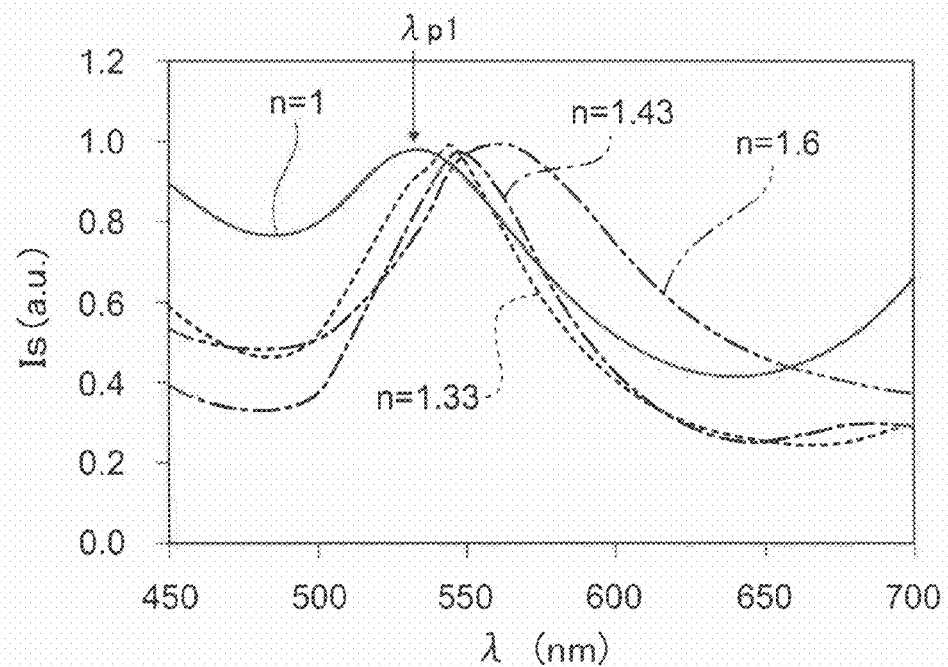
FIGS. 7A and 7B are graphs illustrating experimental results on the display device according to the first embodiment of the invention.
Figure 7B:
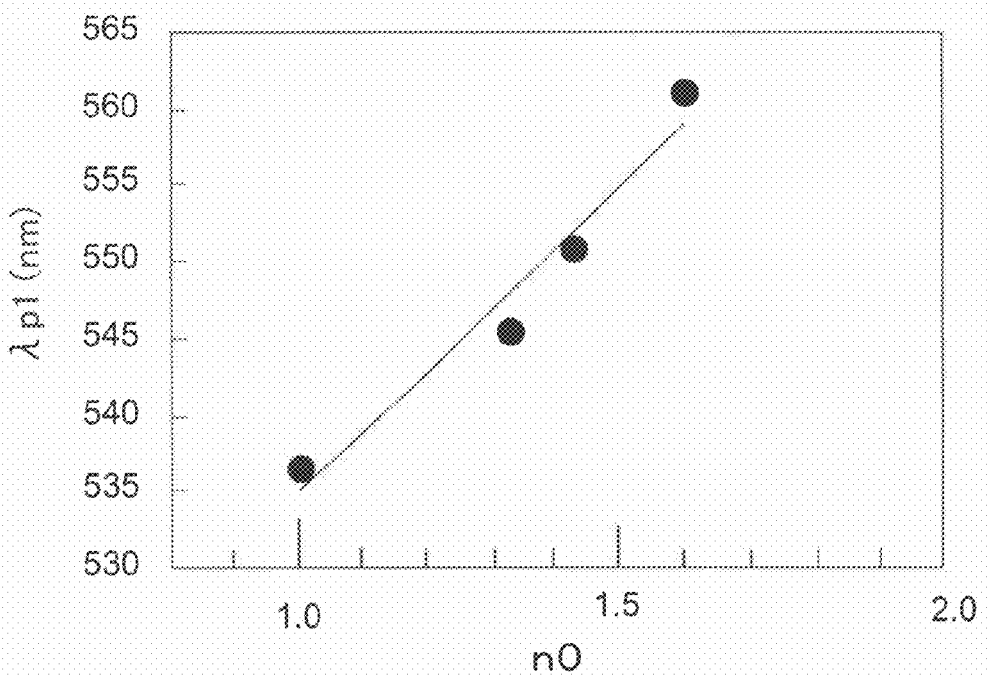
Figure 8A:
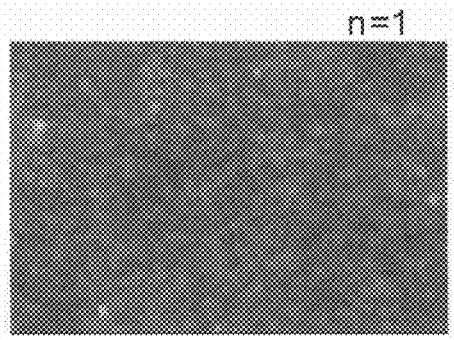
FIGS. 8A to 8D are photomicrographs illustrating experimental results on the display device according to the first embodiment of the invention.
Figure 8B:
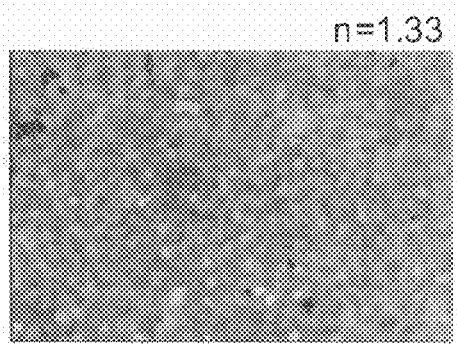
Figure 8C:
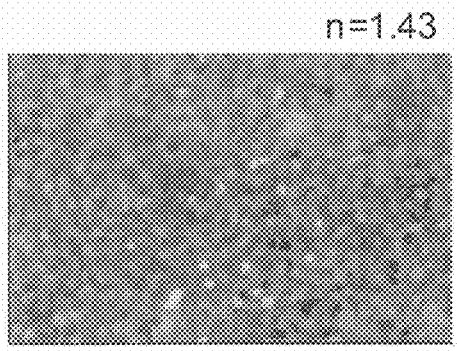
Figure 8D:
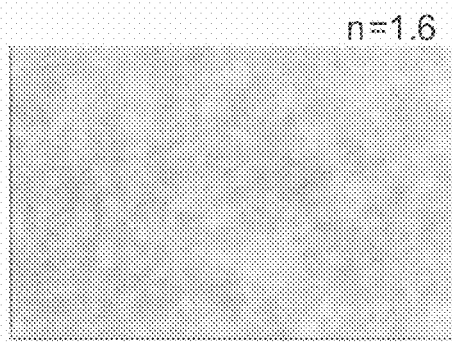

FIGS. 7A and 7B are graphs illustrating experimental results on the display device according to the first embodiment of the invention.

That is, FIG. 7A presents light scattering intensity spectra, where the horizontal axis represents the wavelength $\lambda$, and the vertical axis represents scattering intensity Is on an arbitrary scale.

FIG. 7B is derived from FIG. 7A and presents the refractive index n0 dependence of a peak wavelength $\lambda p1$ of the scattering intensity Is. Here, the refractive index n0 is the refractive index for air, water, ethylene glycol, and liquid crystal. The horizontal axis of FIG. 7B represents the refractive index n0, and the vertical axis represents the peak wavelength $\lambda p1$.

As illustrated in FIG. 7A, in the case where the surroundings of the nanostructure 40 are air, the peak wavelength $\lambda p1$ is approximately 540 nm. In the case where the surroundings of the nanostructure 40 are water (n=1.33), ethylene glycol (n=1.43), and liquid crystal (n=1.6), the peak wavelengths λp1 are approximately 545 nm, approximately 550 nm, and approximately 562 nm, respectively.

As illustrated in FIG. 7B, the peak wavelength λp1 increases as the surroundings of the nanostructure 40 are changed from air through water and ethylene glycol to liquid crystal, accompanied by increasing the refractive index n0.

FIGS. 8A to 8D are photomicrographs illustrating experimental results on the display device according to the first embodiment of the invention.

That is, FIGS. 8A, 8B, 8C, and 8D illustrate dark field images of the nanostructure 40 in the case where the surroundings of the nanostructure 40 are air, water, ethylene glycol, and liquid crystal, respectively.

As illustrated in FIGS. 8A to 8D, changing material of the surroundings of the nanostructure 40 changes a color at the nanostructure 40.

Thus, it is confirmed that, by changing the material of the surroundings of the nanostructure 40 to change the refractive index, the plasmon resonance wavelength of the nanostructure 40 changes and thus the developed color changes.

The display device 110 according to this embodiment is operated by the mechanism described above.

Figure 9A:
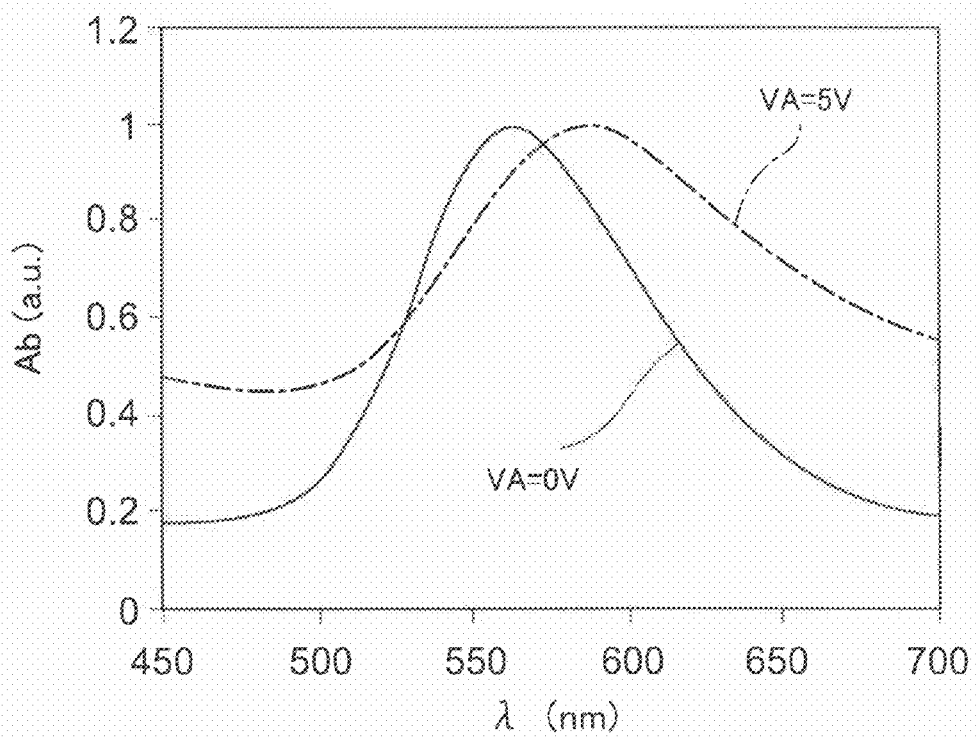
FIGS. 9A and 9B are graphs illustrating characteristics of the display device according to the first embodiment of the invention.
Figure 9B:
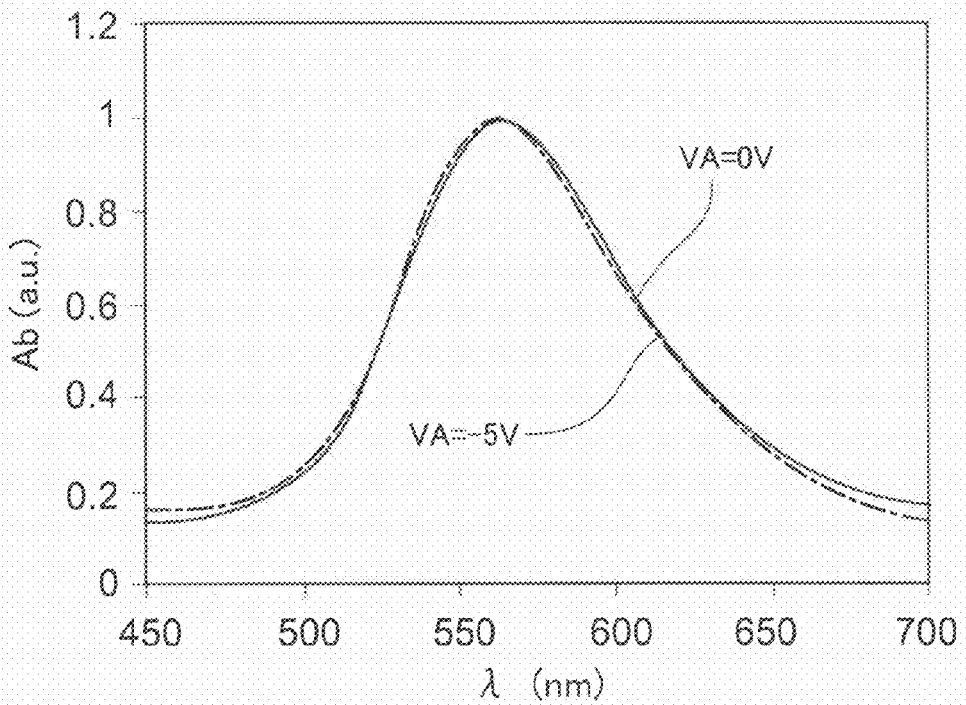

FIGS. 9A and 9B are graphs illustrating characteristics of the display device according to the first embodiment of the invention.

That is, FIG. 9A illustrates characteristics when the applied voltage VA is +5 V in the display device 110, and FIG. 9B illustrates characteristics when the applied voltage VA is −5 V. Characteristics when the applied voltage VA is 0 V are also illustrated in these drawings. FIG. 9A corresponds to the characteristics when the applied voltage VA is 5 V in FIG. 2.

As illustrated in FIG. 9A, when the positive applied voltage VA is applied to the display device 110, the spectrum of the absorbance Ab changes from that when the applied voltage VA is 0 V. This is, as described previously, because the metal compound layer 50 is formed on the surface of the nanostructure 40 by the positive applied voltage VA, and this results in the shift of the plasmon resonance frequency of the nanostructure 40.

On the other hand, as illustrated in FIG. 9B, when the negative applied voltage VA is applied, the spectrum of the absorbance Ab does not change from that when the applied voltage VA is 0 V. This suggests that the negative applied voltage VA does not cause formation of the metal compound layer 50 and the metal compound layer 50 is formed electrochemically.

Conversely, the negative voltage may be used as the applied voltage VA to reduce the generated metal compound layer 50, for example. This promotes forming metal on the surface of the nanostructure 40.

Thus, the display device 110 according to this embodiment controls at least one of the magnitude and the polarity of the applied voltage applied between the first electrode 10 and the second electrode 20, and thereby can change the light absorption characteristics of the optical cell 60 that includes the nanostructure 40, allowing to control the display color.

Components of the optical cell 60 of the display device 110 according to this embodiment will now be described.

The nanostructure 40 has a color development function by the localized surface plasmon, and causes the plasmon to resonate at a desired wavelength in the visible region. Thereby, the nanostructure 40 causes the wavelength component mentioned above to be absorbed to develop a color.

As described previously, this resonance wavelength depends on the refractive index of the surroundings of the surface of the nanostructure 40, and a color change occurs by changing the refractive index of the surroundings by the applied voltage from the outside.

In order to achieve a refractive index change, the display device 110 generates the electrochemical reaction at the surface of the metal nanostructure and deposits or dissolves the metal compound layer 50 that is a reaction product.

It is considered that: this color development by plasmon absorption is caused by a plasma oscillation of an electron; and this occurs because a free electron in a nanostructure is swayed by an optical electric field and thereby a charge comes out on a surface, generating nonlinear polarization. The color development by the plasmon is seen in nanostructures with dimensions of approximately several nanometers to several tens nanometers, and has high saturation and light beam transmittance, and excellent durability.

The nanostructure 40 is formed of a plurality of nanostructure components. That is, the nanostructure components having shapes of nanometer order collect to form the nanostructure 40.

FIGS. 10A to 10H are schematic perspective views illustrating the configurations of a main portion of the display device according to the first embodiment of the invention.

That is, FIGS. 10A to 10H illustrate various kinds of forms of the nanostructure component of the nanostructure 40. Although these drawings illustrate the case where the nanostructure 40 is provided on the first electrode 10, these are also applicable to the case where the nanostructure 40 is provided on the second electrode 20.

Figure 10A:
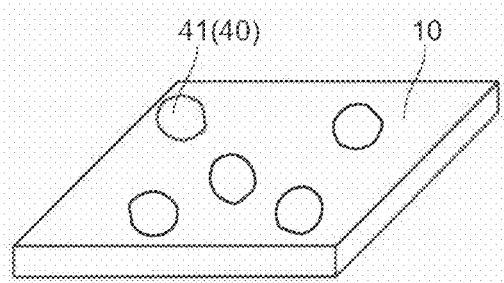
FIGS. 10A to 10H are schematic perspective views illustrating the configurations of a main portion of the display device according to the first embodiment of the invention.

As illustrated in FIG. 10A, a nanostructure component 41 of the nanostructure 40 may have an optional particle shape.

Figure 10B:
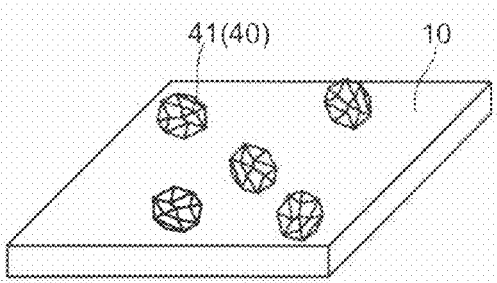

Further, as illustrated in FIG. 10B, the nanostructure component 41 may have an optional polyhedral shape.

Figure 10C:
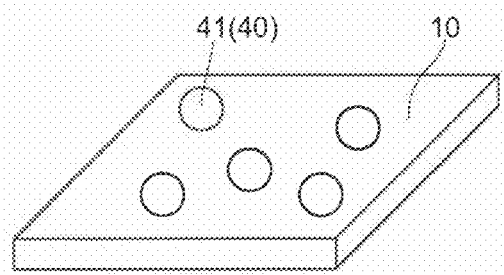

Further, as illustrated in FIG. 10C, the nanostructure component 41 may have a globular shape.

Figure 10D:
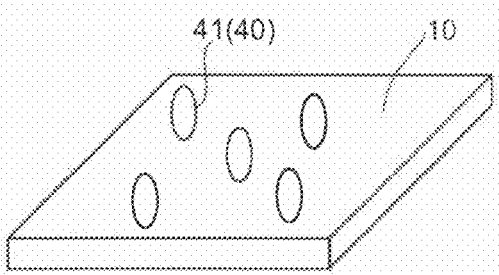

Further, as illustrated in FIG. 10D, the nanostructure component 41 may have a spheroidal shape. Although this specific example illustrates an example in which a length of the spheroid in a rotation axis direction is larger than a diameter of the spheroid, the spheroid may have an optional shape. Further, this specific example is an example in which the axis of the spheroid is perpendicular to the major surface of the first electrode 10.

Figure 10E:
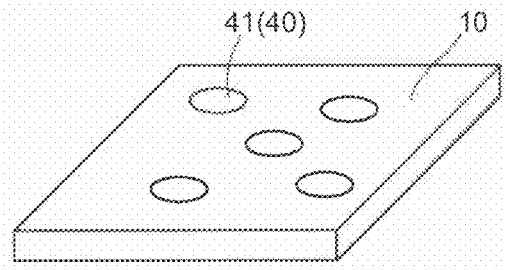

Further, as illustrated in FIG. 10E, the nanostructure component 41 may have the spheroidal shape, where the axis of the spheroid may be parallel to the major surface of the first electrode 10. Further, the axis of the spheroid may be oblique to the major surface of the first electrode 10.

Figure 10F:
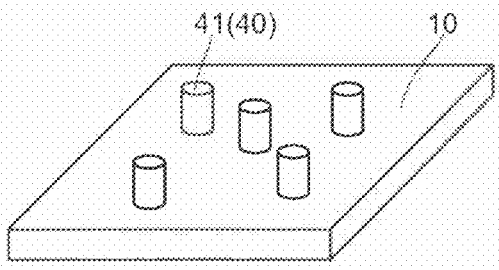

Further, as illustrated in FIG. 10F, the nanostructure component 41 may have a columnar (rod-like) shape. Here, the columnar shape is assumed to be the case where a height of the column is larger (longer) than a diameter of the column. This specific example is an example in which an axis of the column in a height direction is perpendicular to the major surface of the first electrode 10. However, the axis of the column in the height direction may be parallel or oblique to the major surface of the first electrode 10. A cross-section of the column cut with a plane perpendicular to the height direction of the column may be circular or polygonal, that is, optional.

Figure 10G:
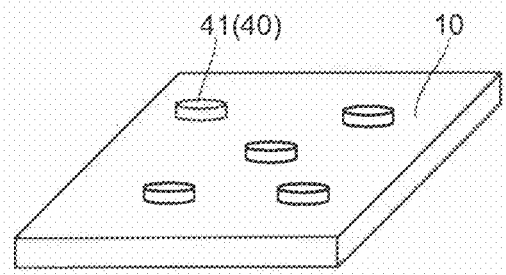
Figure 10H:
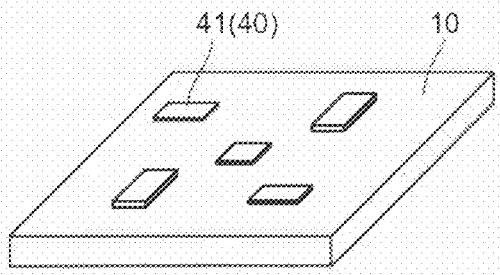

Further, as illustrated in FIGS. 10G and 10H, the nanostructure component 41 may have a plate-like (disc-like or flake-like) shape. Here, the plate-like shape is assumed to be the case where a thickness of the plate is not more than a diameter of the major surface of the plate. This specific example is an example in which an axis of the plate in a thickness direction is perpendicular to the major surface of the first electrode 10. However, the axis of the plate in the thickness direction may be parallel or oblique to the major surface of the first electrode 10.

A shape of a cross-section of the plate cut with a plane perpendicular to the thickness direction may have a circular shape as illustrated in FIG. 10G, or a polygonal shape as illustrated in FIG. 10H, that is, an optional shape.

Other than these, the nanostructure component 41 may have various uneven shapes (nanopattern), various film-like shapes, or the like.

FIGS. 11A to 11E are schematic cross-sectional views illustrating the configurations of a main portion of the display device according to the first embodiment of the invention.

That is, FIGS. 11A to 11E illustrate various kinds of shapes of the nanostructure component of the nanostructure 40. Although these drawings illustrate the case where the nanostructure 40 is provided on the first electrode 10, these are also applicable to the case where the nanostructure 40 is provided on the second electrode 20.

Figure 11A:
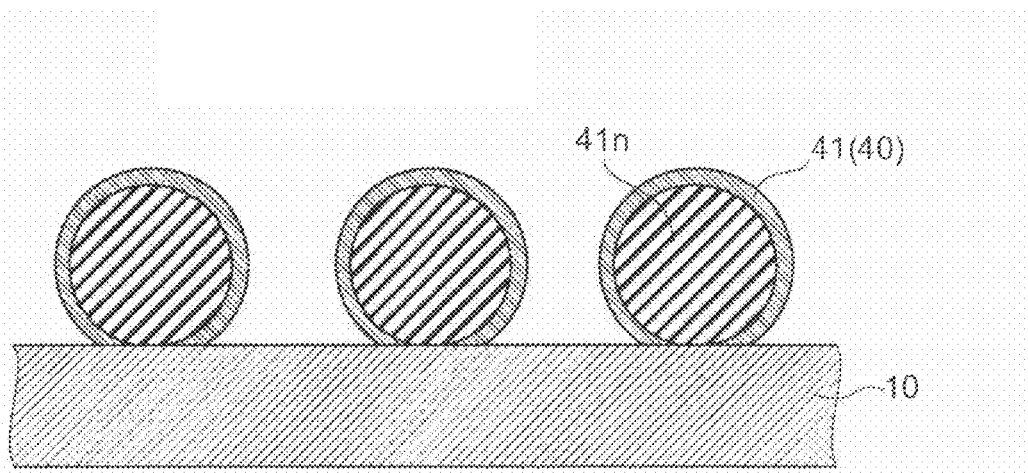
FIGS. 11A to 11E are schematic cross-sectional views illustrating the configurations of a main portion of the display device according to the first embodiment of the invention.

As illustrated in FIG. 11A, the nanostructure component 41 of the nanostructure 40 may have a shell-like shape (shell structure) in which a nucleus member 41n having a particle shape is covered with a thin film of a metal.

Figure 11B:
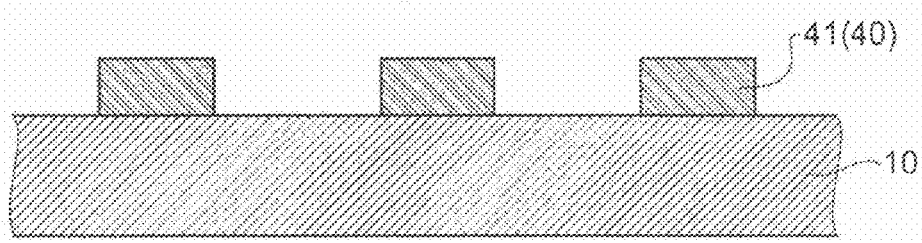

As illustrated in FIG. 11B, the nanostructure component 41 of the nanostructure 40 may be provided on the major surface of the first electrode 10.

Figure 11C:
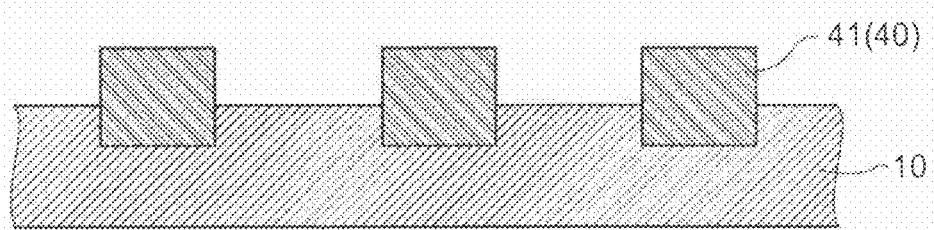

As illustrated in FIG. 11C, part of the nanostructure component 41 of the nanostructure 40 may be embedded in the first electrode 10.

Figure 11D:
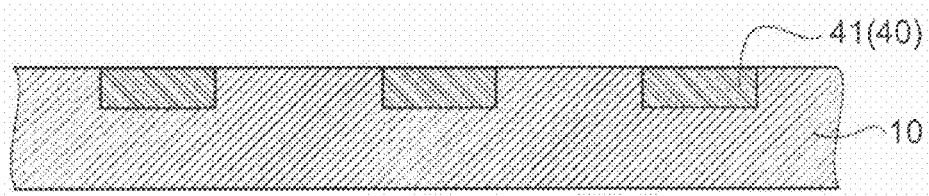

As illustrated in FIG. 11D, the nanostructure component 41 of the nanostructure 40 may be embedded in the first electrode 10, and the major surface of the first electrode 10 and the upper surface of the nanostructure component 41 may be disposed in a substantially identical surface.

Figure 11E:
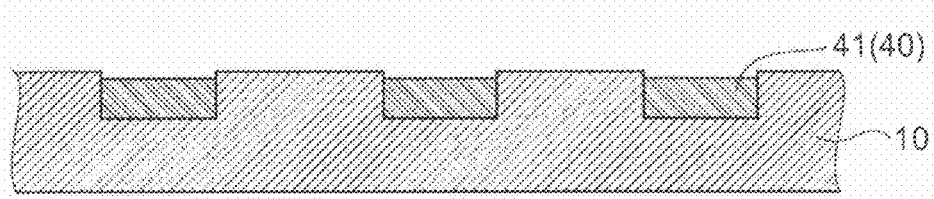

As illustrated in FIG. 11E, the nanostructure component 41 of the nanostructure 40 may be embedded in the first electrode 10, and the upper surface of the nanostructure component 41 may be disposed on the inside from the major surface of the first electrode 10.

Thus, the nanostructure 40 in the display device 110 may have various kinds of shapes and configurations.

In regard to the nanostructure 40, phenomena of the plasmon resonance and the shift of the resonance wavelength thereof depend on characteristics of the nanostructure 40 in the neighborhood of the surface of the nanostructure 40. Therefore, the description of the material used for the nanostructure 40 and the like in the specification of the application may be understood that it is sufficient that the material is used at least for the surface of the nanostructure 40.

In view of application to color display, it is preferable that variation in dimension of the nanostructure component 41 in the nanostructure 40 is small.

A volume average diameter of the nanostructure component of the nanostructure 40 is preferably 10 nm or more and 100 nm or less. That is, if the volume average diameter is smaller than 10 nm or larger than 100 nm, the developed color saturation decreases. Use of the volume average diameter as the particle diameter is based on taking into consideration that, in the case where the nanostructures 40 have various particle diameters, the plasmon resonance occurs at a plurality of frequencies corresponding to the respective volumes of the particle diameters, and resonance resulting from combining the resonances of the plurality of frequencies occurs as the entire nanostructure 40.

The dependence of the change in the resonance frequency on the change in the refractive index of the surroundings of the nanostructure 40 depends on the material, the shape, and the volume average diameter of the nanostructure 40. Therefore, controlling them can develop a color with a desired wavelength, and can perform desired color display.

In the nanostructure 40, when a distance between adjacent nanostructure components is smaller than approximately 200 nm, a coupling of the plasmons occurs and a peak with a new absorption wavelength is generated. Accordingly, the arrangement of the nanostructure components in the nanostructure 40 is appropriately set while taking this coupling of the plasmons into consideration. That is, for example, the distance between the nanostructure components is set to 200 nm or more.

In the case where the nanostructure component has shape anisotropy in the nanostructure 40 (for example, in the case of a rod shape or the like), since the absorption wavelength differs with a polarization direction, the arrangement of the nanostructure components is adjusted while also considering the arrangement direction thereof.

The number of nanostructure components fixed on a substrate may be increased in order to display a color with sufficient saturation. However, in order to prevent the coupling of the plasmons, the distance between adjacent the nanostructure components is preferably twice or more the volume average diameter.

Examples of the material of the nanostructure 40 include a noble metal (gold, silver, ruthenium, rhodium, palladium, osmium, iridium, platinum, etc.), copper, and the like. Further, a semiconductor material such as cadmium selenide may be used for the nanostructure 40.

That is, the metal element contained in the nanostructure 40 may include at least one selected from the group consisting of gold, silver, ruthenium, rhodium, palladium, osmium, iridium, platinum, copper, and cadmium selenide.

Further, out of the metals mentioned above, gold, silver or platinum, or an alloy containing at least one of them is preferably used for the nanostructure 40. Furthermore, the nanostructure 40 more preferably contains at least one of gold and silver.

The nanostructure 40 is illustratively fabricated as follows. For example, the nanostructure 40 can be fabricated by depositing or sputtering one or more of the metals while using an alumina membrane having nanopores as a mask. In this case, the shape and disposition of the nanostructure component 41 depend on a cross-section of the nanopore, and the height can be controlled by metal film-formation time.

The nanostructure 40 can also be fabricated by depositing or sputtering one or more of the metals while using arranged self-assembled microspheres as a mask and then removing the microspheres. In this case, the planar shape of the nanostructure component 41 is a triangle, for example, and the dimension and disposition of the triangle depend on the diameter of the microsphere used. The height can be controlled by the metal film-formation time.

The nanostructure 40 may also be fabricated by EB lithography described below. That is, first, a metal thin film is deposited on the substrate (on one of the first and second electrodes 10 and 20). Then, an EB resist is applied thereonto and the resist is irradiated with an electron beam to form a resist pattern. The resulting resist pattern is used as a mask to etch the metal thin film of a foundation. The nanostructure component 41 thus obtained has a disc-like shape, for example. The shape and disposition can be defined by a resist drawing pattern, and the height can be controlled by the metal film-formation time.

In the case where a nanoparticle of a metal or a semiconductor is used as the nanostructure component 41 of the nanostructure 40, a method may be used in which a dispersion liquid of the nanoparticles is applied onto the substrate (on one of the first and second electrodes 10 and 20), and drying is performed to make the nanoparticles physically adsorb onto the substrate (onto one of the first and second electrodes 10 and 20).

Furthermore, following method may be used. In the method, a dispersant and a self-assembling monolayer (SAM) are fabricated on a substrate (on one of the first and second electrodes 10 and 20). The dispersant is electrically charged weakly around a nanoparticle. The self-assembling monolayer (SAM) has a functional group charged with polarity opposite to that of electrification of the dispersant or has a portion that strongly bonds chemically with the nanoparticle itself. The nanoparticle is fixed on the substrate (on one of the first and second electrodes 10 and 20) via this SAM.

In the above, the shape of the nanostructure component 41 depends on the shape of the nanoparticle used, and the distance between the adjacent nanostructure components 41 is determined by magnitudes of a repulsive force acting between the nanoparticles and an adhesion force between the substrate surface and the nanoparticles.

In the case where the nanostructure component 41 has a shell structure, one or more of the metals may be deposited or sputtered on dielectric microspheres that are arranged in self-assembly on the substrate (one of the first and second electrodes 10 and 20), and thereby the nanostructures 40 can be fabricated. Further, a nanoparticle having a shell structure with a metal on an outer contour may be fabricated and may be applied onto the substrate (one of the first and second electrodes 10 and 20). Thereby, the nanostructure 40 can be fabricated.

Here, the peak wavelength of the plasmon resonance, the shift amount of the peak wavelength, the voltage dependence of the shift amount (dependence on the change in the refractive index of the surroundings), steepness of the resonance characteristics (the half width of the resonance characteristics), driving voltage, and the like at the nanostructure 40 depend on the shape of the nanostructure component 41 and the distance between the adjacent nanostructure components 41. Considering this, when the EB lithography method that can appropriately control the shape and disposition is used in order to obtain desired display characteristics, accuracy of the nanostructure 40 can be improved, which facilitates providing high display performance.

The method for fabricating the nanostructure 40 is not limited to the above but an optional method may be used.

For the nanostructure 40, the same material as at least one of the first electrode 10 and the second electrode 20 on which the nanostructure 40 is provided may be used. At this time, the nanostructure 40 may be an asperity formed at the first electrode 10 and the second electrode 20 on which the nanostructure 40 is provided. In this case, a protruding portion (convex) of the asperity is regarded as the nanostructure 40 and a portion (concave) below the protruding portion is regarded as one of the first electrode 10 and the second electrode 20.

FIGS. 12A to 12D are other schematic cross-sectional views illustrating the configurations of a main portion of the display device according to the first embodiment of the invention.

That is, the drawings illustrate the various configurations of the metal compound layer 50. Although these drawings illustrate the case where the nanostructure 40 is provided on the first electrode 10, these are also applicable to the case where the nanostructure 40 is provided on the second electrode 20.

Figure 12A:
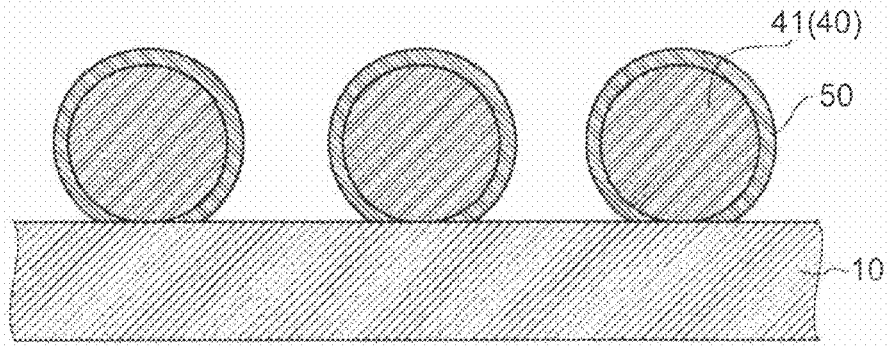
FIGS. 12A to 12D are other schematic cross-sectional views illustrating the configurations of a main portion of the display device according to the first embodiment of the invention.

As illustrated in FIG. 12A, the metal compound layer 50 may be provided so as to cover the nanostructure 40 excluding a plane of the nanostructure 40 in contact with the first electrode 10.

Figure 12B:
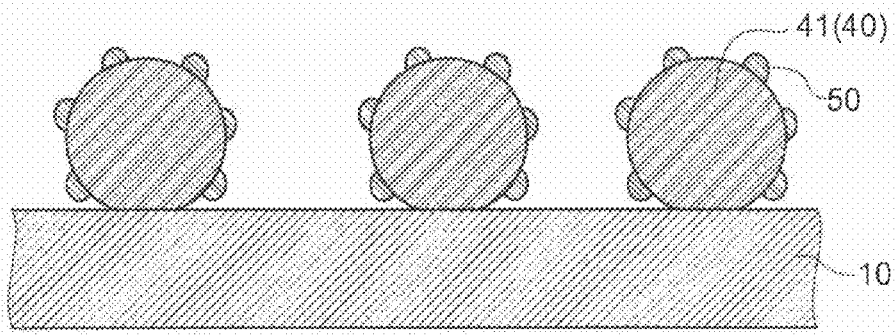

As illustrated in FIG. 12B, the metal compound layer 50 may be provided on part of the surface of the nanostructure 40 in a form of a plurality of independent islands.

Figure 12C:
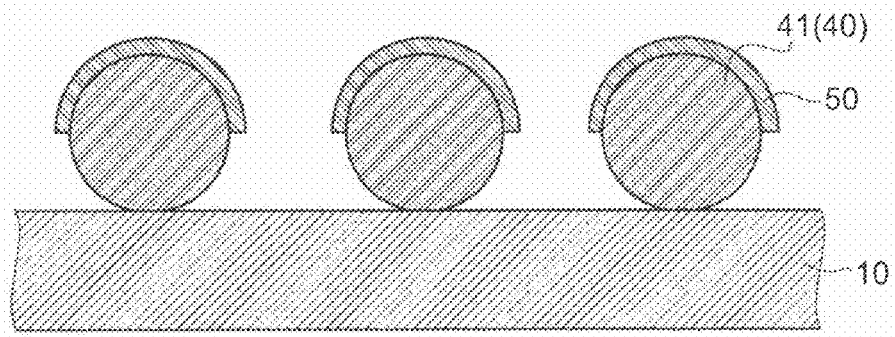

As illustrated in FIG. 12C, the metal compound layer 50 may be provided on the opposite side of the surface of the nanostructure 40 to the side facing the first electrode 10, the nanostructure 40 being provided on the opposite side.

Figure 12D:
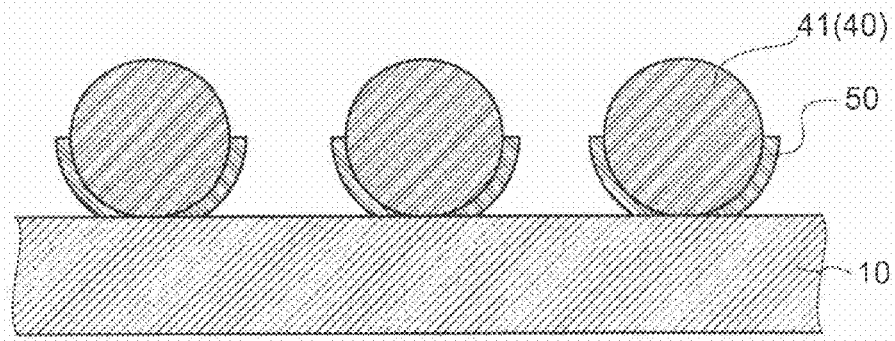

As illustrated in FIG. 12D, the metal compound layer 50 may be provided on the first electrode 10 side on which the nanostructure 40 is provided, of the surface of the nanostructure 40.

Thus, it is sufficient that the metal compound layer 50 is provided on at least part of the surface of the nanostructure 40, and the metal compound layer 50 may have an optional shape. Further, the metal compound layer 50 may also have an optional thickness.

Figure 13:
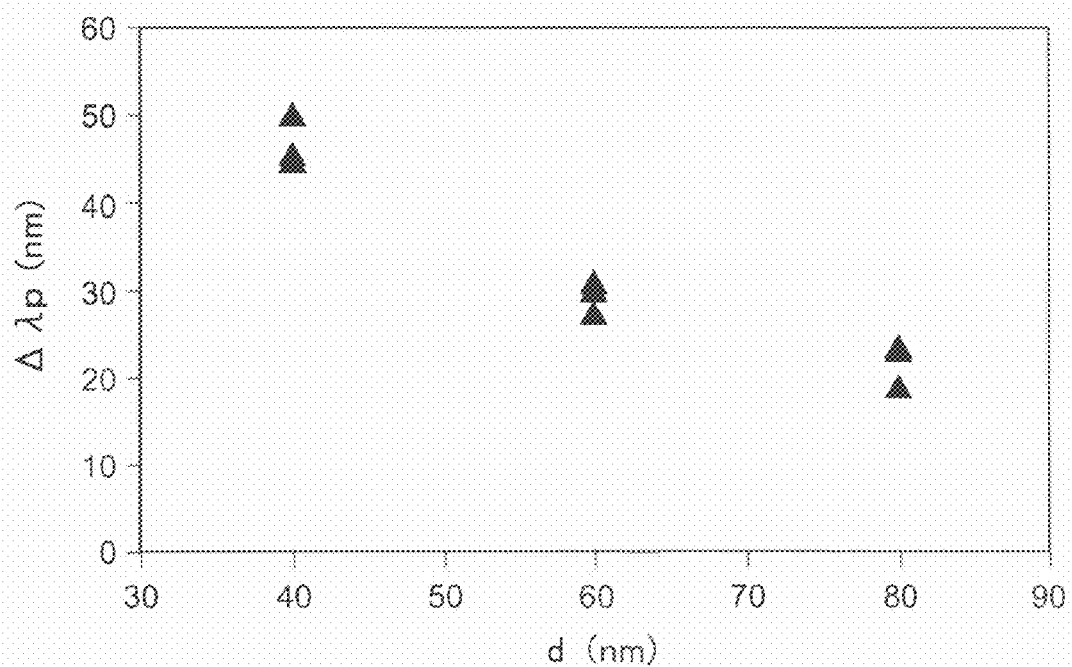
FIG. 13 is a graph illustrating characteristics of the display device according to the first embodiment of the invention.

FIG. 13 is a graph illustrating characteristics of the display device according to the first embodiment of the invention. That is, the drawing illustrates experimental results on the relationship between the particle diameter of the nanostructure 40 (the volume average diameter of the nanostructure component 41) and the shift amount of the absorption peak, $\Delta\lambda p$. The horizontal axis of the drawing represents the particle diameter d of the nanostructure 40, and the vertical axis represents the shift amount of the absorption peak, $\Delta\lambda p$.

In regard to the sample used in the experiment, ITO was used as the first electrode 10 and the second electrode 20, particles made of gold with various particle diameters were used as the nanostructures 40, and the aqueous solution of citric acid (0.02 µg/ml) was used as the ion conduction layer 30. The shift amount of the absorption peak, $\Delta\lambda p$, was defined as a difference between the wavelength of the absorption peak $\lambda p$ when the applied voltage VA is 0 V and the wavelength of the absorption peak $\lambda p$ when the applied voltage VA is 5 V.

As illustrated in FIG. 13, the shift amount of the absorption peak, $\Delta\lambda p$, decreases as the particle diameter d of the nanostructure 40 increases.

A variation in the shift amount of the absorption peak, $\Delta\lambda p$, can be made small by controlling the particle diameter of the nanostructure 40 within a certain range. The shift amount of the absorption peak, $\Delta\lambda p$, can be expanded through making the particle diameter of the nanostructure 40 small.

Thus, the shift amount of the absorption peak, $\Delta\lambda p$, depends on and decreases with the particle diameter d of the nanostructure 40. Therefore, it can be expected that, in this specific example, the metal compound layer 50 is formed in relatively high density on the side close to the first electrode 10 rather than the side distant therefrom of the nanostructure 40. That is, this specific example has a system in which ITO, which is metal oxide, is used for the first electrode 10 on which the nanostructure 40 is provided, and the metal oxide is formed as the metal compound layer 50. At this time, it is expected that the metal compound layer 50 made of the metal oxide is easily formed in the neighborhood of the first electrode 10 made of the metal oxide.

Therefore, the entire nanostructure 40 exists within a distance of a certain range from the first electrode 10 in the case where, for example, the nanostructure 40 has the plate-like shape illustrated in FIGS. 10G and 10H in which the thickness is not more than the diameter, rather than the columnar shape illustrated in FIG. 10F in which the height is larger (longer) than the diameter. Therefore, in this case, the generation of the metal compound layer 50 can be more promoted, and consequently the shift amount of the absorption peak, $\Delta\lambda p$, can be more expanded.

That is, it is preferable that the height of a plurality of the nanostructure components 41 of the nanostructure 40 (the size in the direction perpendicular to the major surfaces of the first electrode 10 on which the nanostructure 40 is provided and the second electrode 20, that is, an average size) is not more than a width (a size in the direction parallel to the major surfaces of the first electrode 10 on which the nanostructure 40 is provided and the second electrode 20, that is, an average size).

The metal compound layer 50 is made of the metal oxide, metal nitride, metal oxynitride, metal sulfide, or the like, for example, and is the metal compound containing the metal element contained in the nanostructure 40. The composition of the metal compound layer 50 can be changed by, for example, the metal element contained in the nanostructure 40, the material of the mobile ion 31, the material of the ion conduction layer 30, the material of the first electrode 10 and the second electrode 20, the polarity of the applied voltage, and the like. It is sufficient that the refractive index n1 of the metal compound layer 50 is different from the refractive index n0 of the ion conduction layer 30, and the metal compound layer 50 may have an optional composition.

An optional conductive material may be used for the first electrode 10 and the second electrode 20.

In the case where a user views the display device 110 from the second electrode 20 side in the configuration in which the first electrode 10 and the second electrode 20 face each other as illustrated in FIG. 1, a conductive film that has translucency to visible light is preferably used for the second electrode 20. Thereby, the user can view a change in the optical absorption of the nanostructure 40 that is disposed on the first electrode 10 side of the second electrode 20.

As the conductive film having the translucency to the visible light, a film of which a material itself has the translucency to the visible light, namely, that of metal oxide such as ITO and $SnO_2$ may be used. Even in the case of a material that itself shields the visible light (for example, metal), a metal film of which a thickness is made sufficiently thin may be used as the conductive film having the translucency to the visible light. Further, a film of a material having an effect of shielding the visible light in which an opening is provided appropriately may be used as the conductive film having the translucency to the visible light.

The conductive film having the translucency to the visible light like this may be used for at least one of the first electrode 10 and the second electrode 20.

A description will now be given of the case where the display device 110 is used as a reflection-type display device, while taking up the case where the user views the display device 110 from the second electrode 20 side.

In this case, reflectivity against the visible light may be given to an electrode not on a viewer side, that is, the first electrode 10. Thereby, the light having entered the display device 110 from the outside can be reflected toward the user with the wavelength characteristics changed by the nanostructure 40.

In this case, the conductive film that has the translucency to the visible light may be used for the first electrode 10, and a reflection layer that has the reflectivity against the visible light may be provided on the back side thereof (on the opposite side of the first electrode 10 to the side facing the second electrode 20). Also in this case, the light having entered the display device 110 can be reflected toward the user with the wavelength characteristics changed by the nanostructure 40.

In the case where the display device 110 is used as a transmission type or a projection type, the conductive film that has the translucency to the visible light may be used for both the first electrode 10 and the second electrode 20 so as to transmit the light from a backlight or a projection light source. Thereby, display by the transmission type or the projection type can be made effective.

Further, in the case of, for example, a configuration in which the nanostructure 40 is provided on the first electrode 10 and the nanostructure 40 is not provided on the second electrode 20, the first electrode 10 serves as an electrode for display (pixel electrode) and the second electrode 20 serves as a path of a current for driving. In this case, the shape and disposition of the second electrode 20 are optional. For example, the second electrode 20 may face part of the first electrode 10 or at an optional position may not face the first electrode 10 in an optional shape. In this case, the second electrode 20 may have optional optical characteristics, and a material having the effect of shielding the visible light may be used as the second electrode 20, for example.

Since the display device 110 utilizes an electrochemical action at the surface of the nanostructure 40, it is preferable that the conductive film of the metal oxide such as ITO and $SnO_2$ is used for the first electrode 10 on which the nanostructure 40 is provided and the second electrode 20. This facilitates stabilizing the metal compound layer 50 which is formed on at least part of the surface of the nanostructure 40 and is chemically unstable.

As described later, in the case where the optical cells 60 are stacked in the direction perpendicular to the layer surface, an insulating layer may be provided between one of the first and second electrodes 10 and 20 of the first stacked optical cell 60 and one of the first and second electrodes 10 and 20 of the second optical cell 60.

For the ion conduction layer 30, an optional material that contains the mobile ion 31 and has the translucency to the visible light may be used. A liquid or a solid such as a solid electrolyte, for example, may be used. In particular, in the case where the ion conduction layer 30 is a liquid, then the first electrode 10, the second electrode 20, an optional substrate and a sealing material, and the like are provided around the ion conduction layer 30, for example, in order to hold the ion conduction layer 30 stably in a space in which the first electrode 10 and the second electrode 20 are provided.

Colorless and transparent water and an organic solvent, and the like, for example, may be used for the ion conduction layer 30, and the ion conduction layer 30 contains a mobile ion in order to obtain the electrochemical reaction for forming the metal compound layer 50. In order to generate the electrochemical reaction, a concentration of the mobile ion 31 is preferably set to 0.05 μg/ml or more, for example.

In the case where an electric resistance of the ion conduction layer 30 is too low, a short occurs between the first electrode 10 and the second electrode 20 and necessary voltage cannot be applied between the first electrode 10 and the second electrode 20. Therefore, the electric resistance of the ion conduction layer 30 is set to not less than a resistance value at which the necessary voltage can be applied between the first electrode 10 and the second electrode 20.

The mobile ion 31 gives and receives a charge to/from the nanostructure 40 during the electrochemical reaction. An anion may be used for the mobile ion 31. For example, an inorganic anion or an organic acid ion may be used. Examples of the inorganic ion include chlorine ion ($Cl^-$), bromine ion ($Br^-$), hexafluorophosphate ion ($PF_6^-$), sulfate ion ($SO_4^{2-}$), and the like. Examples of the organic acid ion include citric acid, ascorbic acid, and the like which have a carboxyl group and/or a hydroxyl group.

At this time, it is necessary that the metal compound layer 50 which is formed on at least part of the surface of the nanostructure 40 is generated and disappears reversibly. To this end, it is preferable that the deposition and dissolution of the metal compound layer 50 can be controlled according to the applied voltage VA in the electrochemical reaction.

In regard to a combination of the mobile ion 31 and the ion conduction layer 30 which satisfies this condition, the aqueous solution in which citric acid is dissolved as the mobile ion 31 may be used as the ion conduction layer 30, for example.

The mobile ion 31 preferably has a size that allows the mobile ion 31 to be unobservable visually so that it may not be seen when the display device 110 is viewed.

Figure 14A:
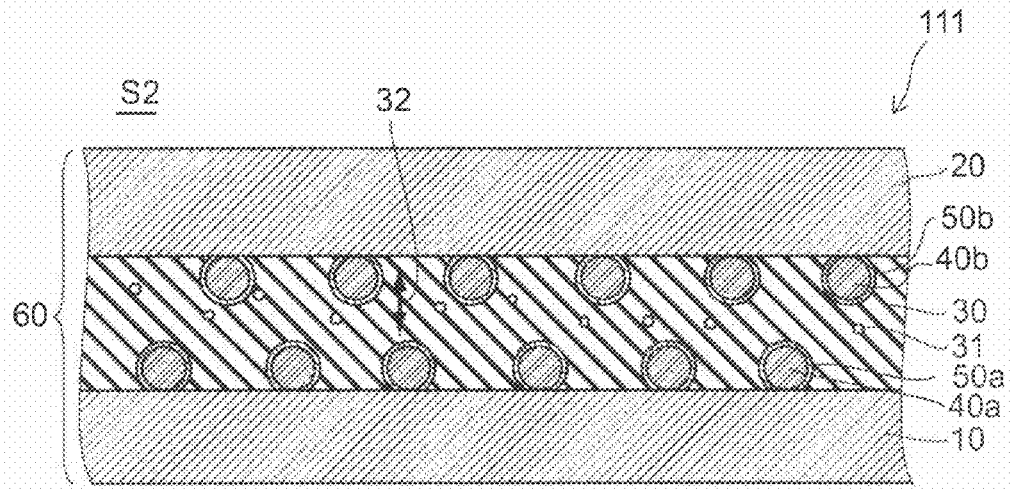
FIGS. 14A and 14B are schematic cross-sectional views illustrating the configurations of other display devices according to the first embodiment of the invention.
Figure 14B:
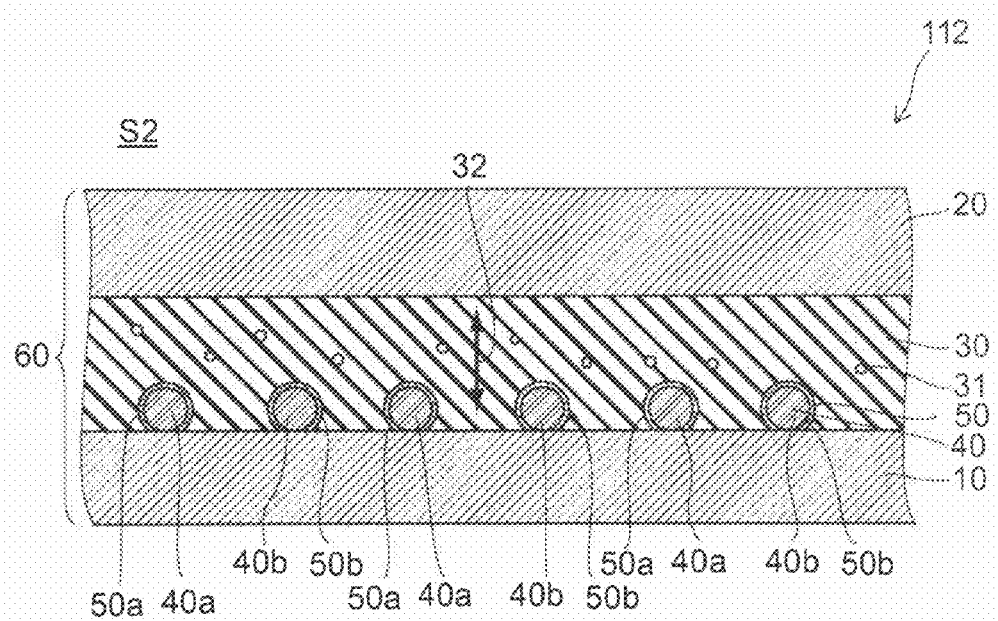

FIGS. 14A and 14B are schematic cross-sectional views illustrating the configurations of other display devices according to the first embodiment of the invention.

That is, FIGS. 14A and 14B illustrate the configurations of the other display devices 111 and 112 according to this embodiment, respectively. These drawings illustrate the second state S2 in which the second voltage V2 is applied to form the metal compound layer 50, and the first state S1 is omitted.

As illustrated in FIG. 14A, in the display device 111, a nanostructure 40a (first nanostructure) is provided on the first electrode 10, and a metal compound layer 50a (first metal compound layer) is provided on the surface of the nanostructure 40a. Further, a nanostructure 40b is provided on the second electrode 20, and a metal compound layer 50b is provided on the surface of the nanostructure 40b.

That is, the optical cell 60 further includes the nanostructure 40b (second nanostructure) that is electrically connected to the second electrode 20, is provided between the second electrode 20 and the ion conduction layer 30, has a plasmon resonance wavelength in the visible region, and contains a metal element (second metal element).

Then, a voltage is applied between the first electrode 10 and the second electrode 20 to form the metal compound layer 50b (second metal compound layer) that contains the second metal element contained in the nanostructure 40b and has a different refractive index from the ion conduction layer 30 on at least part of the surface of the nanostructure 40b.

The amount of the metal compound layer 50b is different between in a third state in which a third voltage is applied between the first electrode 10 and the second electrode 20, and in a fourth state in which a fourth voltage different from the third voltage is applied between the first electrode 10 and the second electrode 20.

Here, the third voltage may be different from the first voltage and the second voltage, or may be equal to one of the first voltage and the second voltage. The fourth voltage may be different from the first voltage and the second voltage, or may be equal to one of the first voltage and the second voltage.

One of the metal elements contained, a shape, a particle diameter, density and disposition may be made different between the nanostructure 40a and the nanostructure 40b. Thereby, at least one of the peak wavelength of the plasmon resonance, the shift amount of the peak wavelength, the voltage dependence of the shift amount, the steepness of the resonance characteristics, and the driving voltage can be made different between the nanostructure 40a and the nanostructure 40b, and thus a plurality of color changes of the color change at the nanostructure 40a and the color change at the nanostructure 40b can be displayed.

The nanostructure 40 that have the same material, the same shape, the same density, and the same disposition may be provided on both the first electrode 10 and the second electrode 20.

As illustrated in FIG. 14B, in the display device 112, the nanostructure 40a (first nanostructure) and the nanostructure 40b (third nanostructure) are provided on the first electrode 10, and the metal compound layer 50a (first metal compound layer) and the metal compound layer 50b (third metal compound layer) are provided on the respective surfaces.

That is, the optical cell 60 further includes the nanostructure 40b (third nanostructure) that is electrically connected to the first electrode 10, is provided between the first electrode 10 and the ion conduction layer 30, and contains a third metal element. The nanostructure 40b has a third plasmon resonance wavelength in the visible region different from a first plasmon resonance wavelength.

Applying a voltage between the first electrode 10 and the second electrode 20 forms the metal compound layer 50b on at least part of the surface of the nanostructure 40b. The metal compound layer 50b contains the third metal element contained in the nanostructure 40b and has a refractive index different from the refractive index of the ion conduction layer 30 and also from the refractive index of the metal compound layer 50a.

The amount of the metal compound layer 50b is different between in a fifth state in which a fifth voltage is applied between the first electrode 10 and the second electrode 20, and in a sixth state in which a sixth voltage different from the fifth voltage is applied between the first electrode 10 and the second electrode 20.

Here, the fifth voltage may be different from the first voltage and the second voltage, and may be equal to one of the first voltage and the second voltage. The sixth voltage may be different from the first voltage and the second voltage, and may be equal to one of the first voltage and the second voltage.

At least one of the metal element contained, a shape, a particle diameter, density and disposition may be made different between the nanostructure 40a and the nanostructure 40b.

Thus, the nanostructures 40a and 40b of different specifications may be provided on the same substrate.

Thereby, a plurality of color changes of the color change at the nanostructure 40a and the color change at the nanostructure 40b can be displayed.

Further, the configuration illustrated in FIG. 14A and the configuration illustrated in FIG. 14B may be combined. That is, nanostructures of a plurality of specifications may be provided on the first electrode 10 side, and nanostructures of a plurality of different specifications from the nanostructures provided on the first electrode 10 may be provided on the second electrode 20 side.

Thus, the display devices 110 to 112 according to this embodiment may be modified variously. Further, the plasmon resonance frequency at the nanostructure 40 can be controlled by the applied voltage VA, and an optional color change can be displayed.

For example, a configuration is possible in which green light is absorbed at the time of the first state S1 and red light is absorbed at the time of the second state S2. Further, a configuration is possible in which red light is absorbed at the time of the first state S1 and infrared light is absorbed at the time of the second state S2. Further, a configuration is possible in which ultraviolet light is absorbed at the time of the first state S1 and blue light is absorbed at the time of the second state S2. This wavelength of the light to be absorbed can be controlled by controlling at least one of the material, the metal element, the shape, the particle diameter, the density and the disposition of the nanostructure 40, the refractive index of the ion conduction layer 30, the type of the mobile ion 31, the refractive index of the metal compound layer 50, and the like. Thereby, a color of an optional hue can be displayed.

Furthermore, white or black color can also be displayed. For example, the nanostructure 40 may be configured so that, for example, it may have a resonance wavelength in the visible region in the first state S1 and, in the second state S2, the resonance wavelengths of the short wavelength region of the visible light may be shifted to an ultraviolet region while shifting the resonance wavelengths of the long wavelength region of the visible light to an infrared region to substantially transmit the visible light in the second state S2. Thereby, the light reflected at a reflection layer disposed at a back face of the optical cell 60 can be visually identified, for example, and this corresponds to a white color state. Further, the inverse of the above corresponds to a black color state. Furthermore, as described later, juxtaposing or stacking the optical cells 60 having different wavelength characteristics can provide an optional display color.

The display devices 110 to 112 mentioned above according to this embodiment may further include an optional light switch layer. For the light switch layer, liquid crystal, MEMS (micro-electro-mechanical system), and the like, for example, may be used. For example, the light switch layer may be disposed at a back face or a front face of the optical cell 60 to control the intensity of light. That is, by combining control of the color change at the optical cell 60 and control of the light intensity at the light switch layer, a control range of display characteristics is more expanded.

Figure 15:
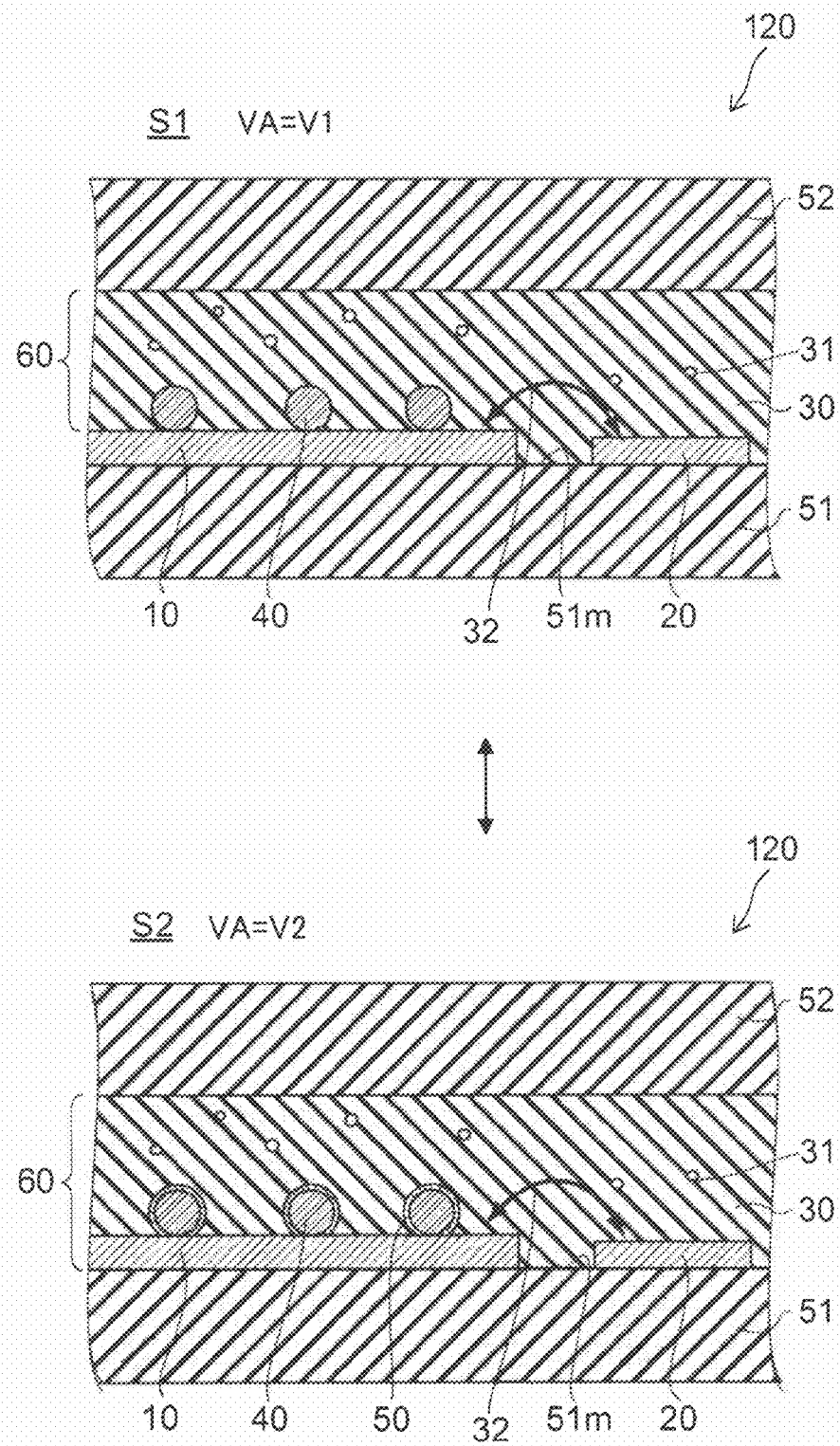
FIG. 15 is a schematic cross-sectional view illustrating a configuration of another display device according to the first embodiment of the invention.

FIG. 15 is a schematic cross-sectional view illustrating the configuration of another display device according to the first embodiment of the invention.

As illustrated in FIG. 15, in the display device 120 according to this embodiment, the first electrode 10 and the second electrode 20 are provided on a major surface 51m of a first substrate 51, and a second substrate 52 faces the major surface 51m of the first substrate 51.

That is, the second electrode 20 is provided on a side facing the first electrode 10 of the ion conduction layer 30. Other than this, the configuration is similar to the display device 110, and therefore a description is omitted.

In this configuration, the ion conduction layer 30 is provided between the first substrate 51 and the second substrate 52. Also in this case, the ion conduction layer 30 faces the first electrode 10 and the second electrode 20. In the case of this configuration, a direction of the current path 32 formed between the first electrode 10 and the second electrode 20 includes a direction included in a plane parallel to the major surface 51m of the first substrate 51. That is, also in this configuration, the ion conduction layer 30 forms the current path 32 between the first electrode 10 and the second electrode 20.

The display device 120 having the configuration like this can also expand the shift amount of the plasmon resonance wavelength by a mechanism similar to the display device 110, and provide a practical display device.

The various modification examples described in regard to the display devices 110, 111, and 112 may be applied to the display device 120.

Examples according to the first embodiment of the invention will now be described.

FIRST EXAMPLE

Figure 16:
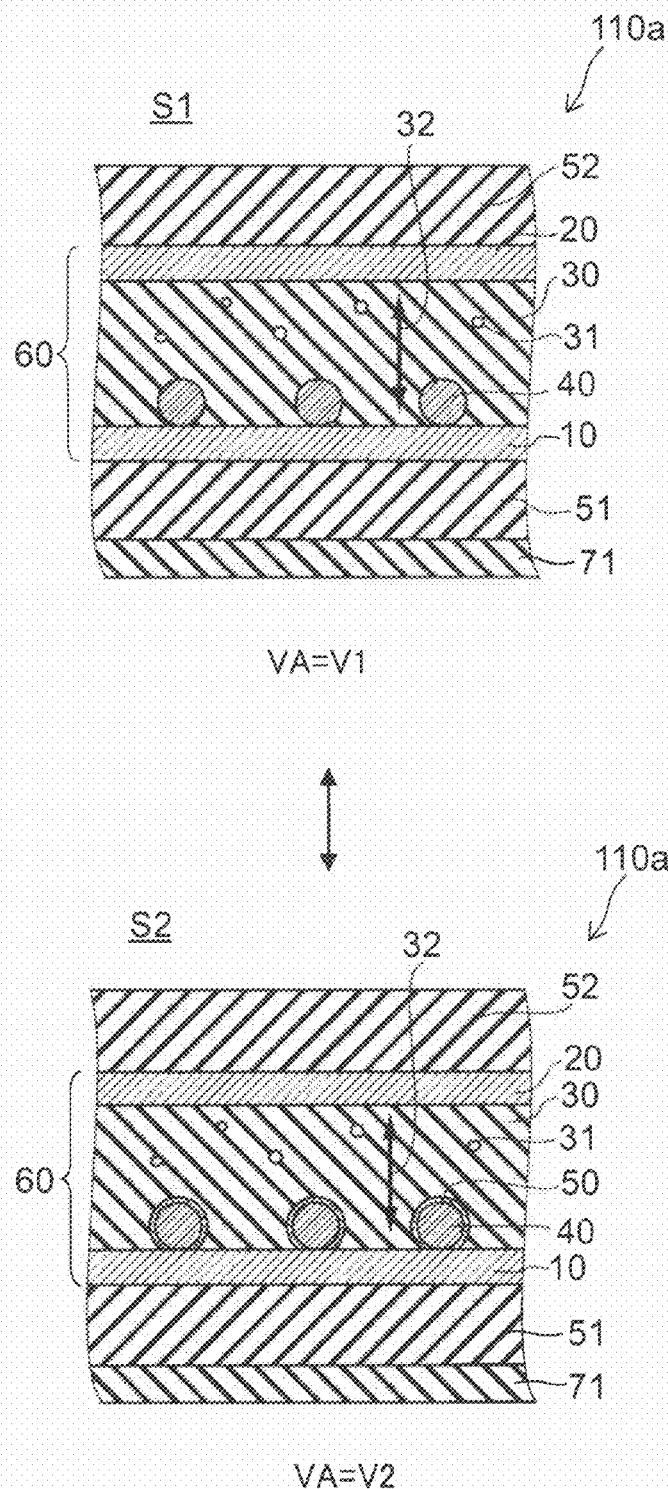
FIG. 16 is a schematic cross-sectional view illustrating the configuration of a display device according to a first example of the invention.

FIG. 16 is a schematic cross-sectional view illustrating the configuration of a display device according to a first example of the invention.

As illustrated in FIG. 16, the display device 110a according to the first example of the invention has the configuration similar to the display device 110 illustrated in FIG. 1. That is, in the display device 110a, the first electrode 10 and the second electrode 20 face each other, and the ion conduction layer 30 is provided therebetween. In the case of the display device 110a, the first electrode 10 is provided on the first substrate 51 and the second electrode 20 is provided on the second substrate 52. Other than this, the configuration similar to the display device 110 may be used, and therefore a description is omitted.

In this example, a translucent glass substrate is used for the first substrate 51 and the second substrate 52. ITO is used for the first electrode 10 and the second electrode 20. Gold particles with a volume average diameter of approximately 40 nm are used for the nanostructures 40. The nanostructure 40 is provided on the first electrode 10.

A reflection layer 71 is provided on an underside (the opposite side to the side facing the second substrate 52) of the first substrate 51. As the reflection layer 71, a layer containing a white pigment such as titanium oxide, zinc oxide, calcium carbonate, barium sulfate, and the like is used, for example.

In this example, for the ion conduction layer 30, an aqueous solution containing an inorganic ion such as chlorine ion ($Cl^-$), bromine ion ($Br^-$), hexafluorophosphate ion ($PF_6^-$), and sulfate ion ($SO_4^{2-}$) as the mobile ion is used.

In this case, it is preferable that the nanostructure 40 is chemically stable against this inorganic ion and has a plasmon resonance wavelength in the ultraviolet region in a vacuum. For example, ruthenium, rhodium, palladium, osmium, iridium, platinum, and the like may be used.

SECOND EXAMPLE

Figure 17:
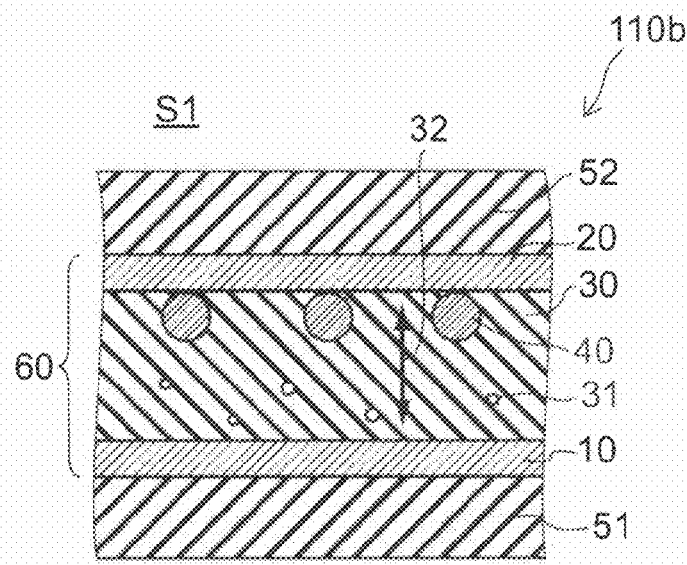
FIG. 17 is a schematic cross-sectional view illustrating the configuration of a display device according to a second example of the invention.
Figure 17:
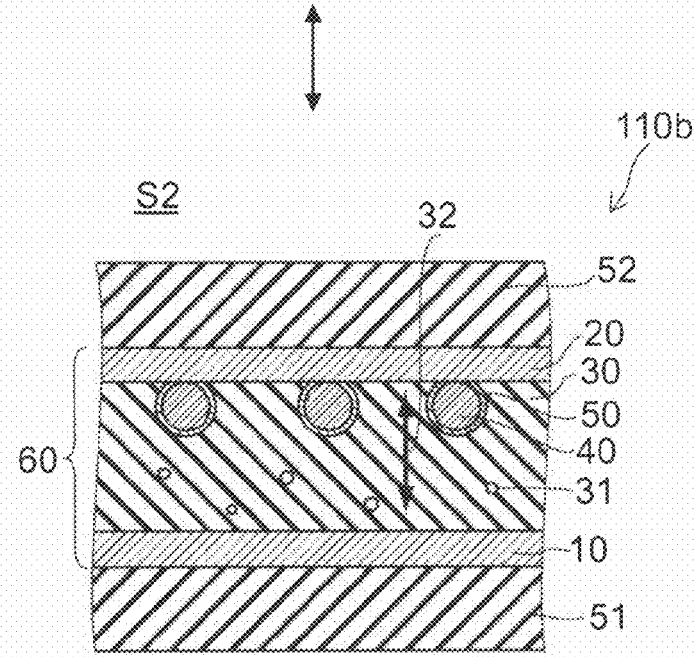

FIG. 17 is a schematic cross-sectional view illustrating the configuration of a display device according to a second example of the invention.

As illustrated in FIG. 17, in a display device 110b according to the second example of the invention, the first electrode 10 and the second electrode 20 face each other, and the ion conduction layer 30 is provided therebetween. The first electrode 10 is provided on the first substrate 51 and the second electrode 20 is provided on the second substrate 52.

The nanostructure 40 is provided on the second electrode 20. ITO, for example, is used for the second electrode 20, and reflective silver is used for the first electrode 10. The configuration similar to the display device 110a, for example, may be used for the ion conduction layer 30 and the nanostructure 40.

In the display device 110b, since a reflective electrode is used for the first electrode 10, the reflection layer 71 described in regard to the display device 110a can be omitted.

(Second Embodiment)

A display device according to a second embodiment of the invention includes the plurality of optical cells described in regard to the first embodiment.

Figure 18:
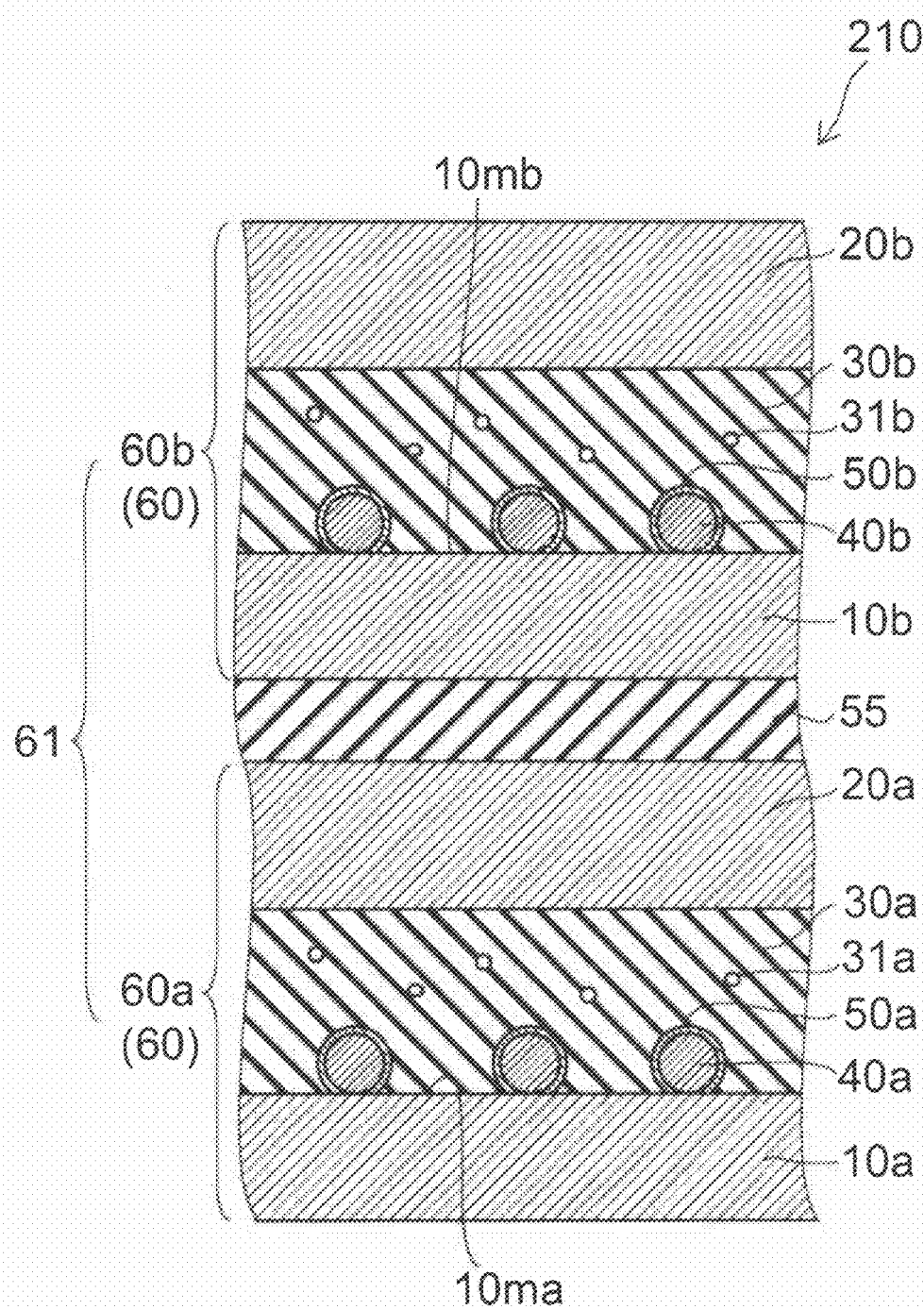
FIG. 18 is a schematic cross-sectional view illustrating the configuration of a display device according to a second embodiment of the invention.

FIG. 18 is a schematic cross-sectional view illustrating the configuration of a display device according to the second embodiment of the invention.

As illustrated in FIG. 18, the display device 210 according to this embodiment includes a component optical layer 61.

The component optical layer 61 includes layers of a plurality of the optical cells 60. The plurality of the optical cells 60 are the optical cells 60a and 60b that are alternately stacked, for example.

The optical cells 60a and 60b have the configuration similar to the optical cell 60 described in regard to the first embodiment. That is, the optical cell 60a includes a first electrode 10a, a second electrode 20a, an ion conduction layer 30a containing a mobile ion 31a, and the nanostructure 40a. The amount of the metal compound layer 50a that is formed by applying a voltage is variable. The first electrode 10a and the second electrode 20a face each other. Likewise, the optical cell 60b includes a first electrode 10b, a second electrode 20b, an ion conduction layer 30b containing a mobile ion 31b, and the nanostructure 40b, and the amount of the metal compound layer 50b that is formed by applying a voltage is variable. The first electrode 10b and the second electrode 20b face each other.

An insulating layer 55 is provided between the second electrode 20a and the first electrode 10b.

Thus, the component optical layer 61 includes the plurality of the optical cells 60a and 60b; first major surfaces 10ma and 10mb of the respective first electrodes 10a and 10b of the plurality of the optical cells 60a and 60b are parallel to each other; and the plurality of the optical cells 60a and 60b are stacked in a direction perpendicular to the first major surfaces 10ma and 10mb.

At this time, the plasmon resonance wavelengths of the respective nanostructures 40a and 40b of the plurality of the optical cells 60 (optical cells 60a and 60b) included in the component optical layer 61 may be made different from each other. For example, at least one of the material, the metal element, the shape, the particle diameter, the density, and the disposition of the nanostructure 40, and at least one of the refractive index of the ion conduction layer 30, the type of the mobile ion 31, and the refractive index of the metal compound layer 50 are made different between the optical cells 60a and 60b.

Thereby, the display colors of the plurality of the optical cells 60a and 60b can be mixed, which allows to display various colors.

Although the component optical layer 61 includes two optical cells 60 in this specific example, the number of the optical cells 60 provided in the component optical layer 61 is optional. For example, a configuration is possible in which three optical cells 60 are provided. For example, these three optical cells 60 may be configured so that they may change colors between respective three colors of red, green and blue, and other colors, or may be configured so that they may change colors between respective three colors of cyan, magenta and yellow, and other colors.

Thereby, an optional color can be displayed.

THIRD EXAMPLE

Figure 19:
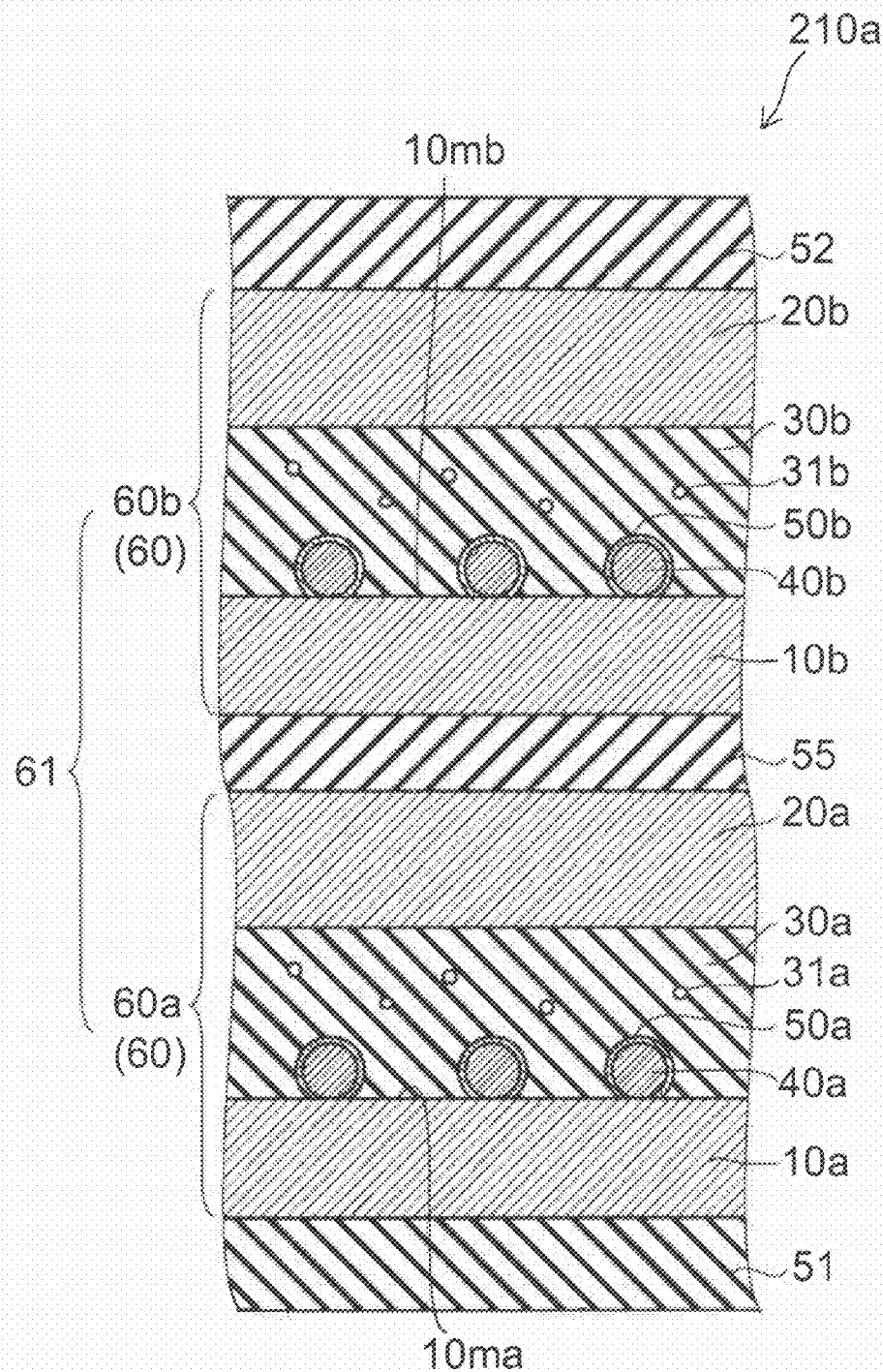
FIG. 19 is a schematic cross-sectional view illustrating the configuration of a display device according to a third example of the invention.

FIG. 19 is a schematic cross-sectional view illustrating the configuration of a display device according to a third example of the invention.

As illustrated in FIG. 19, the display device 210a of the third example according to the second embodiment of the invention has the configuration similar to the display device 210 illustrated in FIG. 18. In the case of this example, the first electrode 10a of the first layer is provided on the first substrate 51. On the other hand, the second electrode 20b of the second layer is provided on the second substrate 52.

ITO is used for the first electrodes 10a and 10b, and the second electrodes 20a and 20b.

The nanostructure 40a of the first layer is designed so that it may shift the peak wavelength of the plasmon resonance in the short wavelength region from the ultraviolet region to the visible region by generation of the metal compound layer 50. Ruthenium, rhodium, palladium, osmium, iridium, platinum, and the like may be used for the nanostructure 40a. An aqueous solution containing monovalent or multivalent inorganic anion or organic acid ion as the mobile ion 31a may be used for the ion conduction layer 30a of the first layer.

On the other hand, the nanostructure 40b of the second layer is designed so that it may shift the peak wavelength of the plasmon resonance in the long wavelength region of from green to infrared by generation of the metal compound layer 50. Gold, for example, may be used for the nanostructure 40b. A material having a low affinity with gold such as a multivalent organic acid ion is preferably used as the mobile ion 31b contained in the ion conduction layer 30b of the second layer. For example, citric acid and ascorbic acid which have a carboxyl group and/or a hydroxyl group may be used. That is, an aqueous solution of citric acid or ascorbic acid is used for the ion conduction layer 30b of the second layer.

A material translucent to the visible light may be used for the first substrate 51, the second substrate 52, and the insulating layer 55.

The optical cell 60a of the first layer and the optical cell 60b of the second layer mentioned above may be mutually exchanged.

Figure 20:
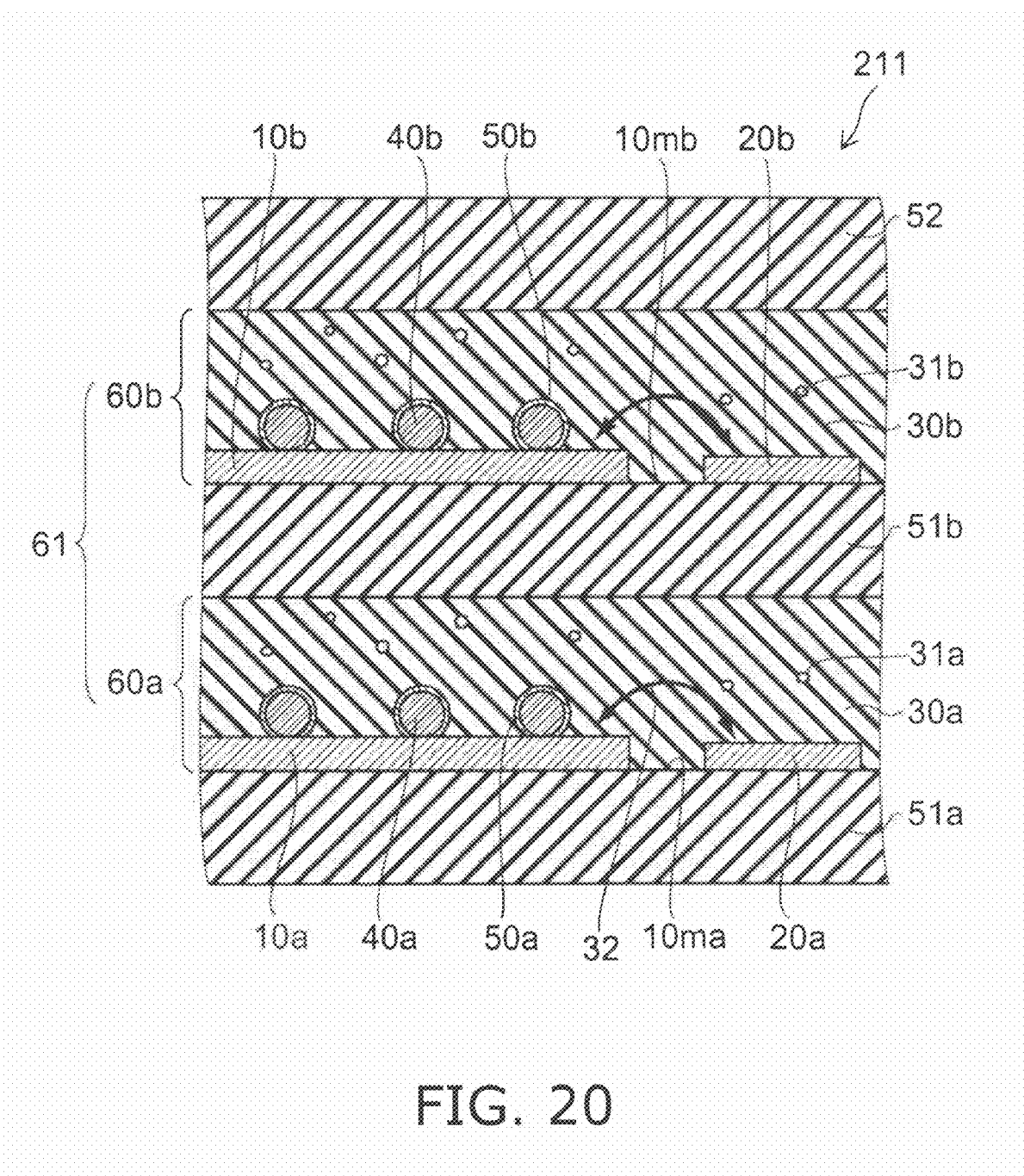
FIG. 20 is a schematic cross-sectional view illustrating the configuration of another display device according to the second embodiment of the invention.

FIG. 20 is a schematic cross-sectional view illustrating the configuration of another display device according to the second embodiment of the invention.

As illustrated in FIG. 20, the display device 211 according to this embodiment includes the component optical layer 61.

Also in this case, the component optical layer 61 includes a plurality of the optical cells 60a and 60b. In the optical cells 60a and 60b, the first electrode 10a and the second electrode 20a are juxtaposed and the first electrode 10b and the second electrode 20b are juxtaposed. That is, the display device 211 has the configuration in which a plurality of the display devices 120 are stacked.

In the display device 211, the first electrode 10a and the second electrode 20a of the first layer are provided on the first substrate 51a of the first layer, the first electrode 10b and the second electrode 20b of the second layer are provided on a first substrate 51b of the second layer, and the second substrate 52 is provided so as to face the first substrate 51b of the second layer. The ion conduction layer 30a of the first layer is provided between the first substrate 51a of the first layer and the first substrate 51b of the second layer, and the ion conduction layer 30b of the second layer is provided between the first substrate 51b of the second layer and the second substrate 52.

Also in this case, the plasmon resonance wavelengths of the respective nanostructures 40a and 40b of the plurality of the optical cells 60 (optical cells 60a and 60b) included in the component optical layer 61 may be made different from each other. Thereby, the display colors of the plurality of the optical cells 60a and 60b can be mixed, which allows to display various colors.

Although the component optical layer 61 includes two optical cells 60 in this specific example, the number of the optical cells 60 provided in the component optical layer 61 is optional. For example, a configuration is possible in which three optical cells 60 are provided. For example, these three optical cells 60 may be configured so that they may change colors between respective three colors of red, green and blue, and other colors, or may be configured so that they may change colors between respective three colors of cyan, magenta and yellow, and other colors.

Thereby, an optional color can be displayed.

Figure 21:
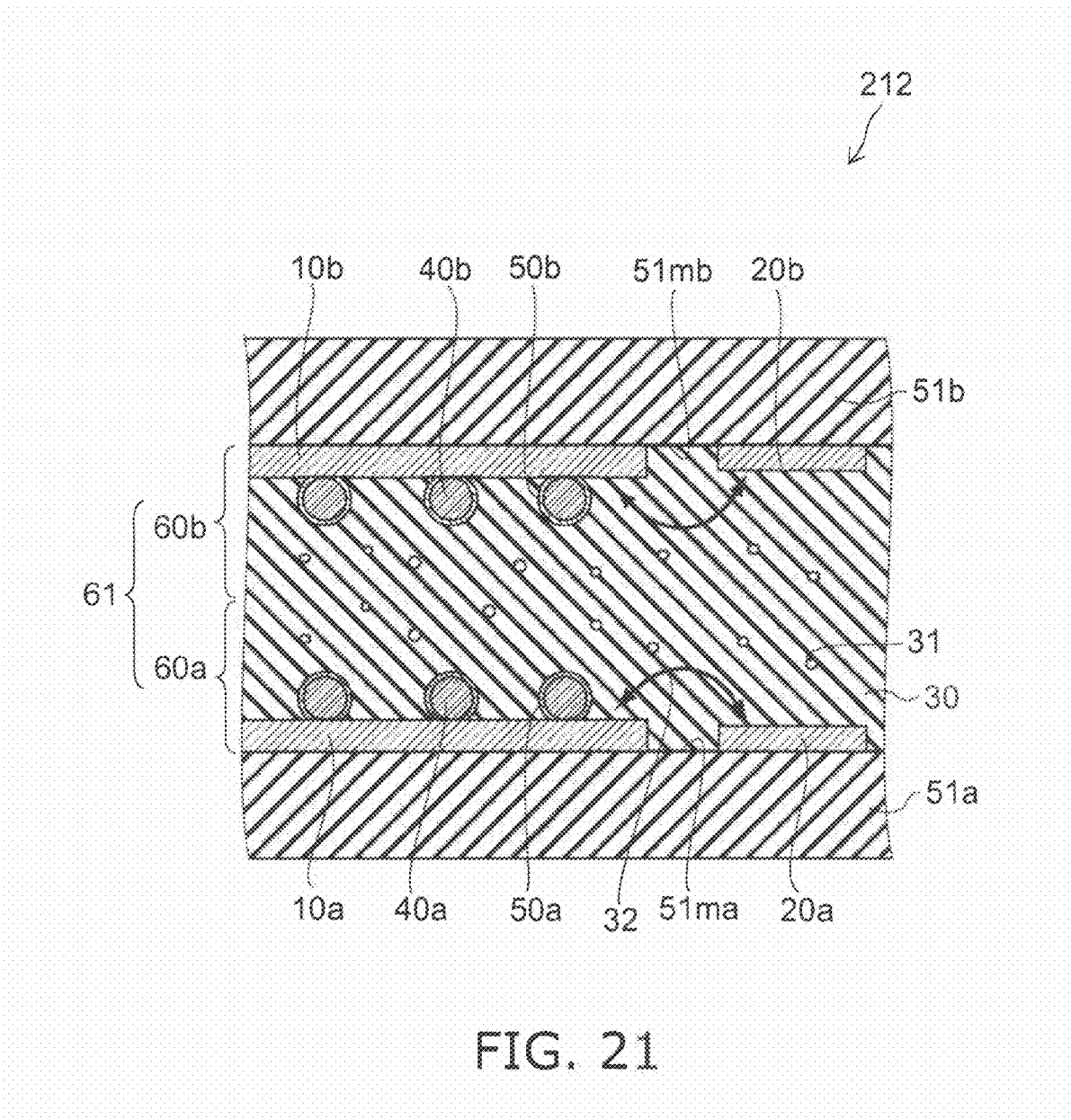
FIG. 21 is a schematic cross-sectional view illustrating the configuration of another display device according to the second embodiment of the invention.

FIG. 21 is a schematic cross-sectional view illustrating the configuration of another display device according to the second embodiment of the invention.

As illustrated in FIG. 21, in the display device 212 according to this embodiment, the second substrate 52 in the display device 211 is omitted, and a major surface 51ma of the first substrate 51a of the first layer and a major surface 51mb of the first substrate 51b of the second layer are disposed facing each other.

The ion conduction layer 30 is shared between the optical cell 60a of the first layer and the optical cell 60b of the second layer.

In this specific example, the first electrode 10a of the first layer on which the nanostructure 40a is provided and the first electrode 10b of the second layer on which the nanostructure 40b is provided so as to face each other. At this time, the voltage between the first electrode 10a and the second electrode 20a of the first layer may be changed and the voltage between the first electrode 10b and the second electrode 20b of the second layer may be changed, while setting the electric potentials of the first electrode 10a of the first layer and the first electrode 10b of the second layer to a substantially equal value. Thereby, colors can be controlled independently in the optical cell 60a of the first layer and the optical cell 60b of the second layer.

Figure 22:
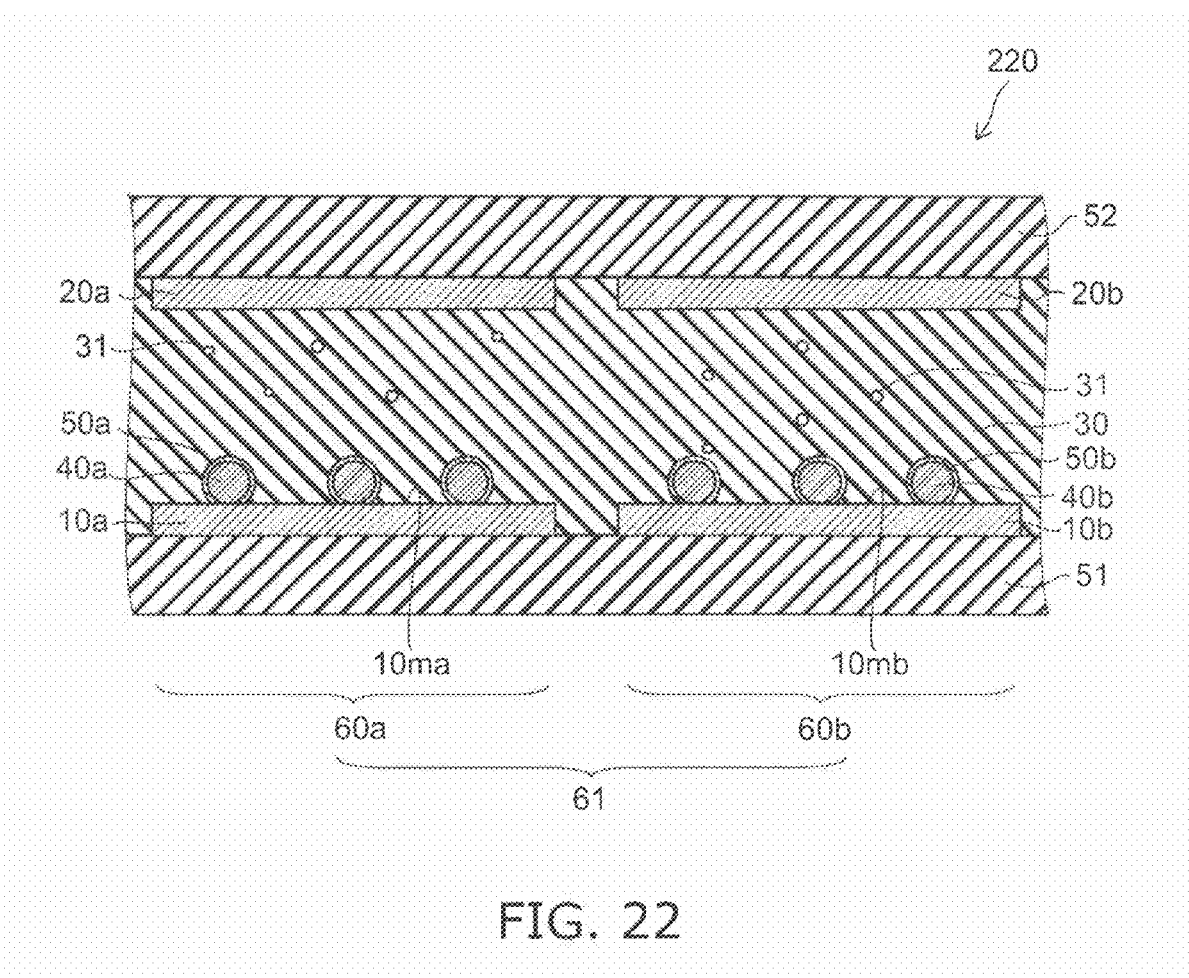
FIG. 22 is a schematic cross-sectional view illustrating the configuration of another display device according to the second embodiment of the invention.

FIG. 22 is a schematic cross-sectional view illustrating the configuration of another display device according to the second embodiment of the invention.

As illustrated in FIG. 22, the display device 220 according to this embodiment also includes the component optical layer 61. The plurality of the optical cells 60 (optical cells 60a and 60b) included in the component optical layer 61 are juxtaposed in a plane parallel to the layer surface. In this specific example, the first electrode and the second electrode in the respective optical cells 60a and 60b are disposed facing each other, and the ion conduction layer 30 is provided therebetween.

That is, the component optical layer 61 includes the plurality of the optical cells 60a and 60b; the first major surfaces 10ma and 10mb of the respective first electrodes 10a and 10b of the plurality of optical cells 60a and 60b are parallel to each other; and the plurality of optical cells 60a and 60b are juxtaposed in a direction parallel to the first major surfaces 10ma and 10mb.

Also at this time, the plasmon resonance wavelengths of the respective nanostructures 40a and 40b of the plurality of the optical cells 60 (optical cells 60a and 60b) included in the component optical layer 61 may be made different from each other. Thereby, the display colors of the plurality of the optical cells 60a and 60b can be mixed, which allows to display various colors.

Although the component optical layer 61 includes two optical cells 60 in this specific example, the number of the optical cells 60 provided in the component optical layer 61 is optional. For example, a configuration is possible in which three optical cells 60 are provided. For example, these three optical cells 60 may be configured so that they may change colors between respective three colors of red, green and blue, and other colors, or may be configured so that they may change colors between respective three colors of cyan, magenta and yellow, and other colors.

Thereby, an optional color can be displayed.

Figure 23A:
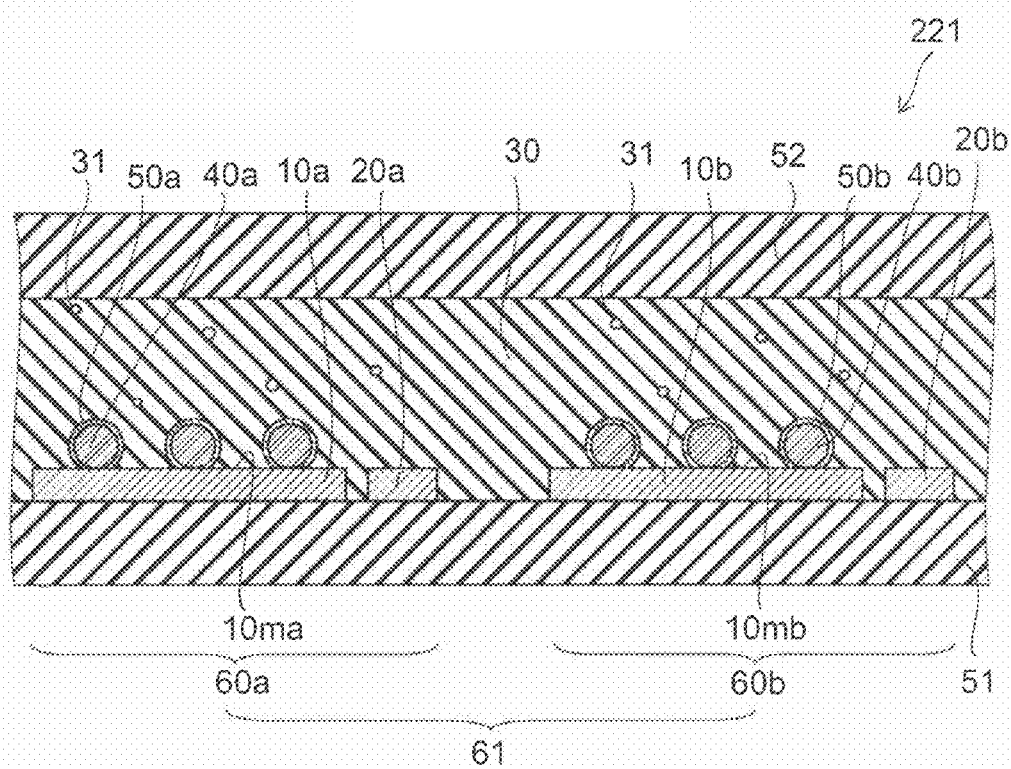
FIGS. 23A and 23B are schematic cross-sectional views illustrating the configurations of other display devices according to the second embodiment of the invention.
Figure 23B:
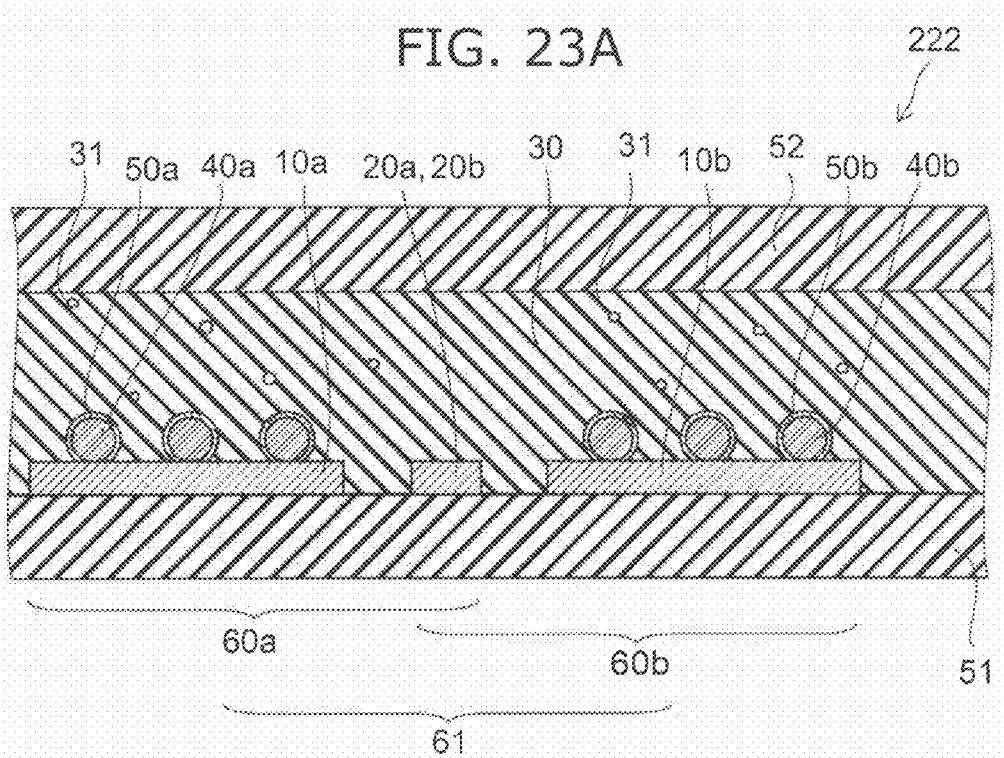

FIGS. 23A and 23B are schematic cross-sectional views illustrating the configurations of other display devices according to the second embodiment of the invention.

As illustrated in FIG. 23A, also in the other display device 221 according to this embodiment, a plurality of the optical cells 60 (optical cells 60a and 60b) included in the component optical layer 61 are juxtaposed in a plane parallel to the layer surface. In the display device 221, the first electrode 10a and the second electrode 20a of the optical cell 60a are placed in juxtaposition with each other, and the first electrode 10b and the second electrode 20b of the optical cell 60b are placed in juxtaposition with each other.

As illustrated in FIG. 23B, in the other display device 222 according to this embodiment, the second electrode is shared between the optical cell 60a and the optical cell 60b, and the second electrode 20a included in the optical cell 60a and the second electrode 20b included in the optical cell 60b are the same.

Thus, components of the display device according to this embodiment may be modified variously.

(Third Embodiment)

Figure 24A:
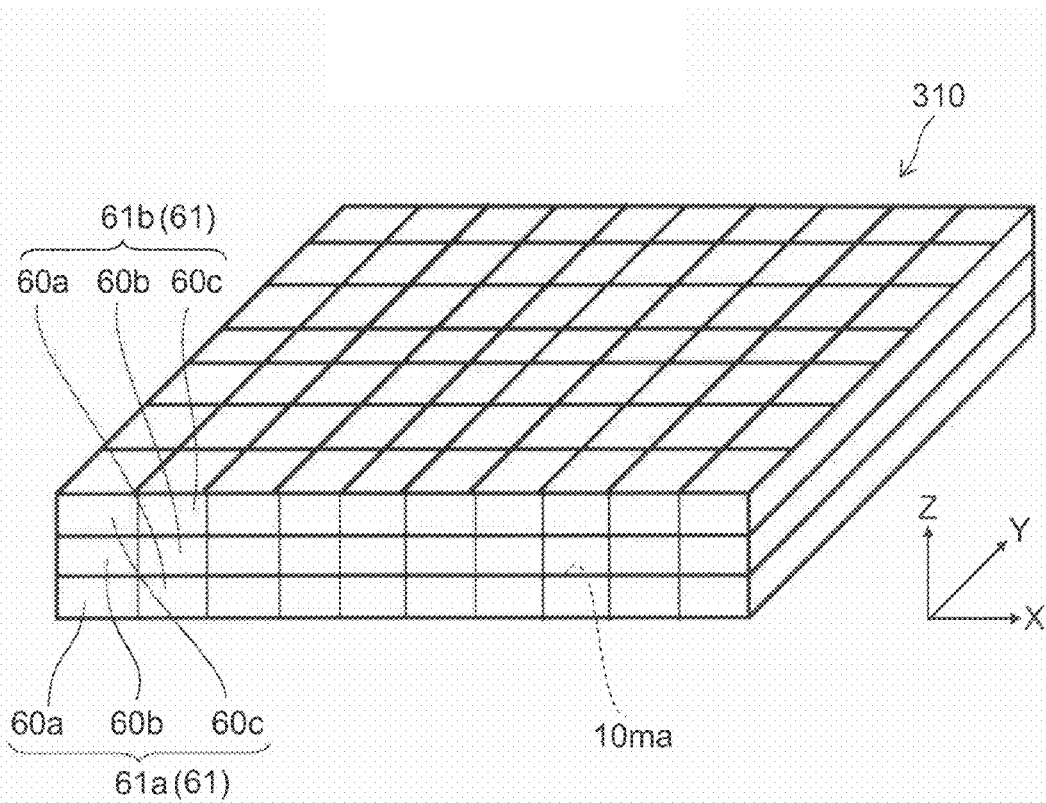
FIGS. 24A and 24B are schematic cross-sectional views illustrating the configurations of display devices according to a third embodiment of the invention.
Figure 24B:
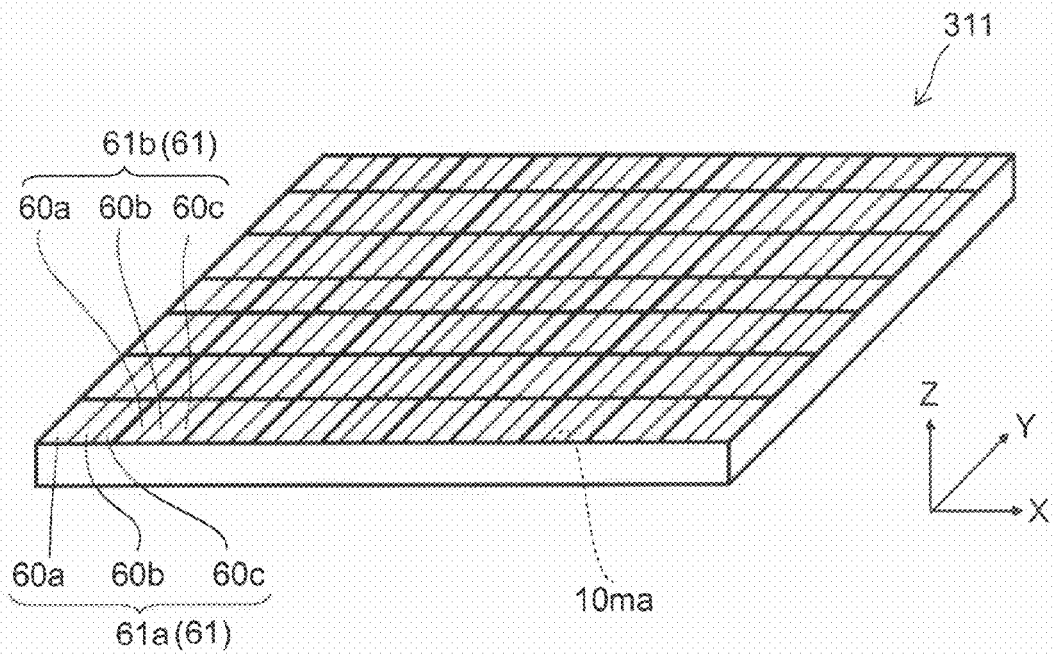

FIGS. 24A and 24B are schematic cross-sectional views illustrating the configurations of display devices according to a third embodiment of the invention.

As illustrated in FIG. 24A, the display device 310 according to the third embodiment of the invention includes a plurality of the component optical layers 61. That is, for example, they are component optical layers 61a and 61b.

Each of the plurality of the component optical layers 61 is one of the component optical layers described in regard to the display devices 210, 211, 212, 220, 221, and 222 according to the second embodiment.

In this specific example, each component optical layer 61 includes three optical cells 60a, 60b, and 60c, and the optical cells 60a, 60b, and 60c are stacked.

Here, a plane parallel to the first major surface 10ma of the first electrode 10a is defined as an XY plane, one direction in the XY plane is defined as an X-axis direction, and a direction perpendicular to the X-axis direction in the XY plane is defined as a Y-axis direction. Further, a direction perpendicular to the X-axis direction and the Y-axis direction is defined as a Z-axis direction.

That is, the optical cells 60a, 60b, and 60c are stacked in the Z-axis direction.

The plurality of the component optical layers 61 of the configuration like this form one pixel respectively and are arranged in a plane parallel to the layer surface of the component optical layer 61. For example, the plurality of the component optical layers 61 are arranged in a matrix form in the X-axis direction and the Y-axis direction.

Thus, the display device 310 includes the plurality of the component optical layers 61. The plurality of the component optical layers 61 are juxtaposed in a plane parallel to the first major surface 10ma of the first electrode 10 of the optical cell 60 included in the component optical layer 61.

This can provide a display device that can display an optional figure and letter with an optional color.

As illustrated in FIG. 24B, in the other display device 311 according to this embodiment, the optical cells 60a, 60b, and 60c are juxtaposed in the plane (the XY plane) parallel to the first major surface 10ma in each of the component optical layers 61a and 61b.

This case can also provide a display device that can display an optional figure and letter with an optional color.

Thus, the plurality of the component optical layers 61 juxtaposed in a matrix form can be driven by, for example, a method such as passive matrix driving and active matrix driving. In the case of the passive matrix driving, a voltage averaging method may be used, for example. The active matrix driving is preferable in regard to display performance, which does not require steepness regarding the applied voltage VA dependence of the optical characteristics in the component optical layer 61. In the case of the active matrix driving, a two-terminal switching element, a three-terminal switching element, and the like may be used. The three-terminal switching element is preferably used in regard to controllability. A thin film transistor (TFT), for example, may be used as the three-terminal switching element.

(Fourth Embodiment)

A display device according to a fourth embodiment of the invention is a display device of the active matrix driving.

Figure 25:
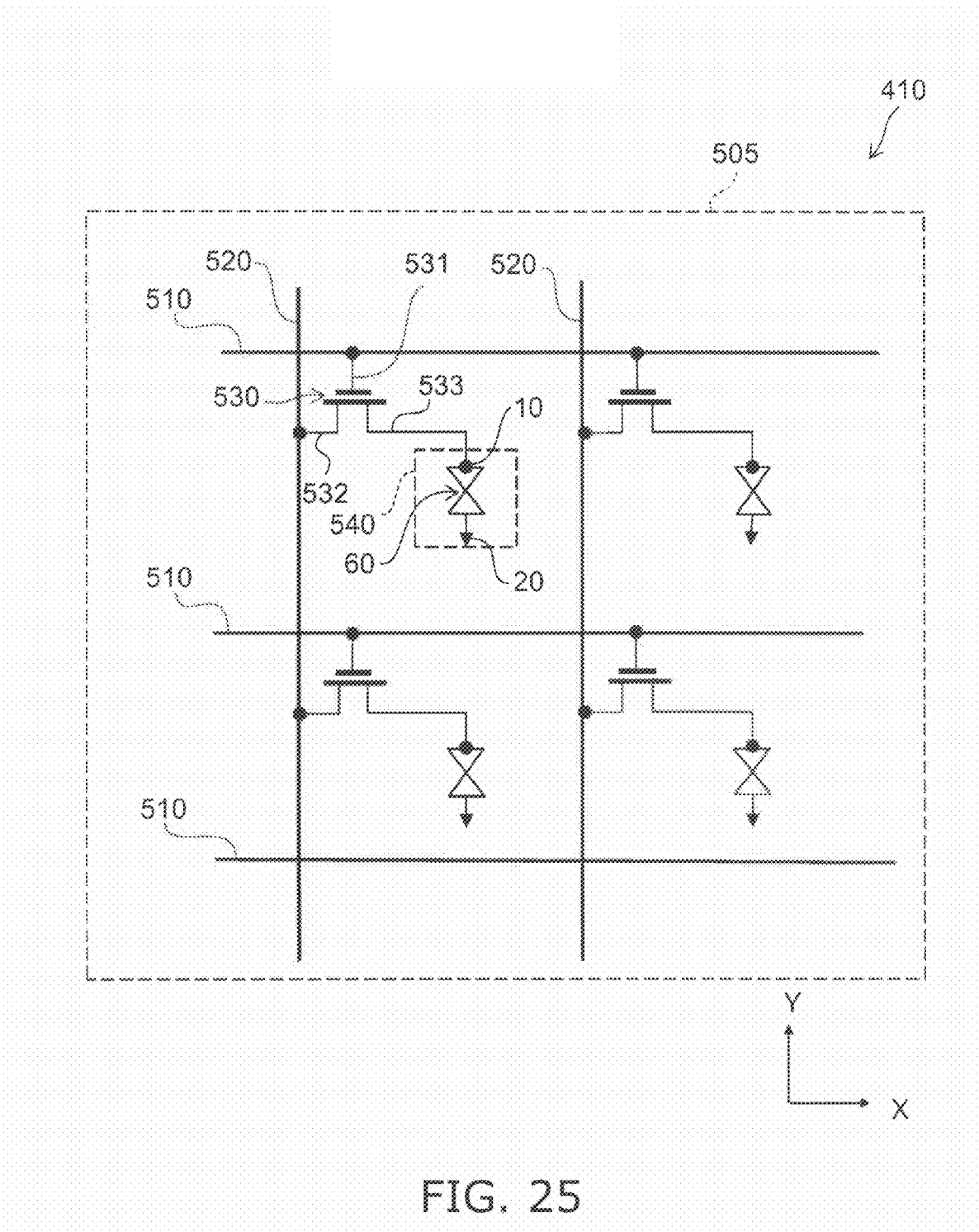
FIG. 25 is a schematic circuit diagram illustrating the configuration of a display device according to a fourth embodiment of the invention.

FIG. 25 is a schematic circuit diagram illustrating the configuration of the display device according to the fourth embodiment of the invention.

As illustrated in FIG. 25, the display device 410 according to the fourth embodiment of the invention includes an active matrix optical layer 505.

The active matrix optical layer 505 includes a plurality of scanning lines 510 and a plurality of signal lines 520.

The plurality of the scanning lines 510 extend in a first direction (for example, the X-axis direction) and the plurality of the signal lines 520 extend in a second direction (for example, the Y-axis direction) nonparallel to the first direction. The first direction and the second direction are at right angles to each other, for example.

The active matrix optical layer 505 further includes a plurality of switching elements 530 and a plurality of display components 540 that are each provided to correspond to an intersection of each of the plurality of the scanning lines 510 and each of the plurality of the signal lines 520.

A TFT, for example, is used as the switching element 530. A gate electrode 531 of each switching element 530 is connected to each scanning line 510. A source electrode 532, for example, of each switching element 530 is connected to each signal line 520. A drain electrode 533, for example, of each switching element 530 is connected to each display component 540. The source electrode 532 and the drain electrode 533 mentioned above may be mutually exchanged.

Each display component 540 includes the optical cell 60 according to embodiments of the invention. One of the first electrode 10 and the second electrode 20 of the optical cell 60 is connected to the drain electrode 533 mentioned above, and the other is set at another electric potential. In this specific example, the first electrode 10 is connected to the drain electrode 533 and the second electrode 20 is set at a counter electric potential.

Thereby, an optional voltage is applied to the optical cell 60 of each display component 540 via the switching element 530, and the optical cell 60 of each display component 540 can present an optional change in optical characteristics.

In a display device of an active matrix type like this, each display component 540 may have an optional configuration.

That is, the display components 540 that are arranged in a matrix form may have a configuration in which a plurality of sets of the component optical layers 61 that can present different display colors are arranged repeatedly.

For example, as the display device 311 illustrated in FIG. 24B, the optical cells 60a, 60b, and 60c having different optical characteristics may be juxtaposed in the XY plane, and the component optical layers 61 including these optical cells 60a, 60b, and 60c may be further juxtaposed in the XY plane.

In this case, the component optical layer 61 that includes the optical cells 60a, 60b, and 60c juxtaposed in the XY plane forms a sub display component.

The display device in this case includes a plurality of the sub display components, and each of the plurality of the sub display components includes the plurality of the display components 540. The plasmon resonance wavelengths of the respective nanostructures 40 of the optical cells 60 of the display components 540 in each of the plurality of the sub display components are different from each other.

Further, the active matrix optical layer 505 illustrated in FIG. 25 may be stacked. In this case, as the display device 310 illustrated in FIG. 24A, for example, the optical cells 60a, 60b, and 60c having different optical characteristics are stacked in the Z-axis direction, and the component optical layers 61 including these optical cells 60a, 60b, and 60c are juxtaposed in the XY plane.

The display device in this case includes a plurality of the active matrix optical layers 505, and the plurality of the active matrix optical layers 505 are stacked in the Z-axis direction (the direction perpendicular to a plane including the first direction and the second direction). The plasmon resonance wavelengths of the respective nanostructures 40 of the optical cells 60 of the plurality of the display components 540 of the plurality of the active matrix optical layers 505 are different from each other.

Thus, the active matrix optical layer 505 has an optional configuration. Further, the active matrix optical layers 505 may be combined in an optional configuration.

Figure 26:
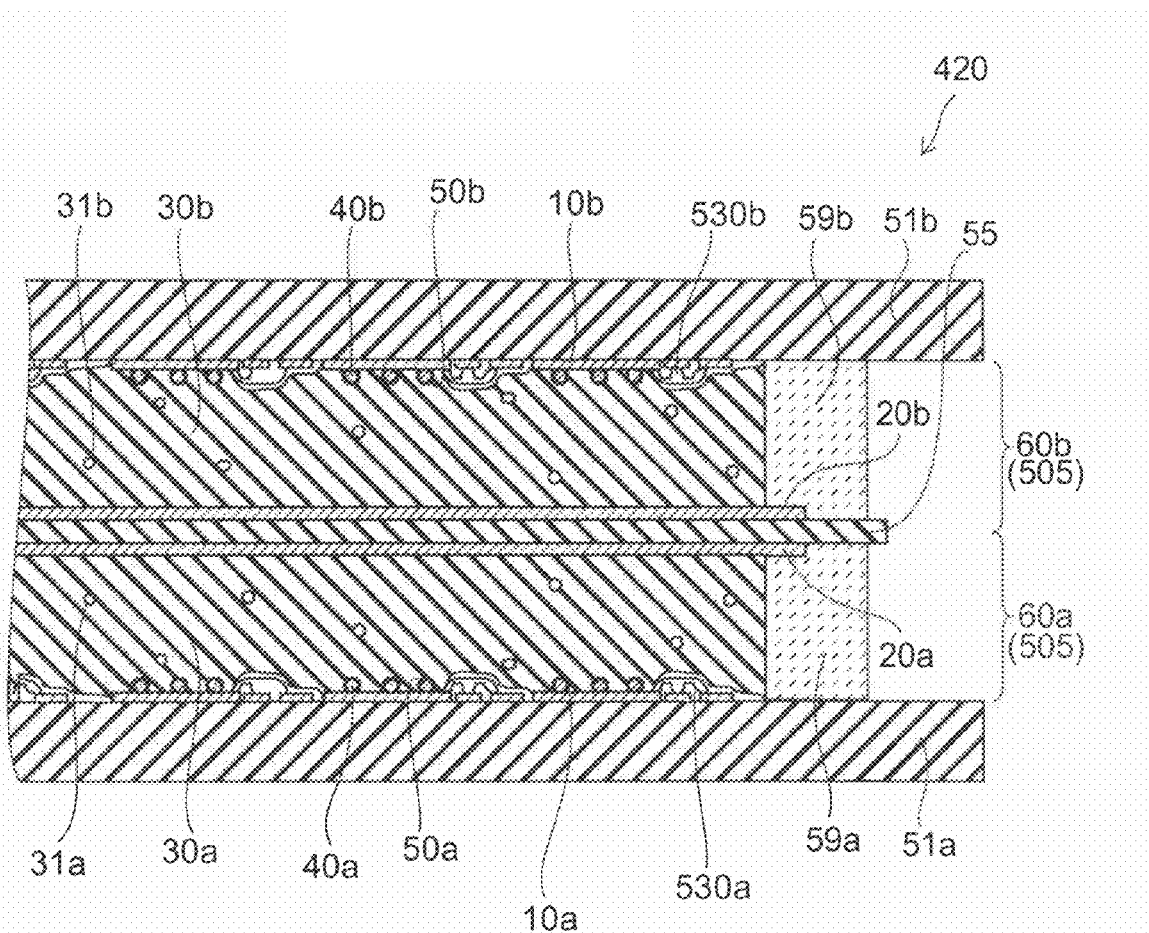
FIG. 26 is a schematic cross-sectional view illustrating the configuration of another display device according to the fourth embodiment of the invention.

FIG. 26 is a schematic cross-sectional view illustrating the configuration of another display device according to the fourth embodiment of the invention.

As illustrated in FIG. 26, in the display device 420 according to this embodiment, the active matrix optical layers 505 are stacked, and the optical cell 60a and the optical cell 60b are stacked.

That is, a switching element 530a of the active matrix optical layer 505 in a lower half part of the drawing is provided on the first substrate 51a. That is, the switching element 530a, the first electrode 10a, the scanning line 510 (not illustrated), and the signal line 520 (not illustrated) are provided on the first substrate 51a. The nanostructure 40a is provided on the first electrode 10a, and the metal compound layer 50a can be formed on the surface of the nanostructure 40a by applying a voltage.

On the other hand, a switching element 530b of the active matrix optical layer 505 in an upper half part of the drawing is provided on the first substrate 51b. That is, the switching element 530b, the first electrode 10b, the scanning line 510 (not illustrated), and the signal line 520 (not illustrated) are provided on the first substrate 51b. The nanostructure 40b is provided on the first electrode 10b, and the metal compound layer 50b can be formed on the surface of the nanostructure 40b by applying a voltage.

The nanostructure 40a and the nanostructure 40b have optical characteristics different from each other.

The first substrate 51a and the first substrate 51b are disposed facing each other. The insulating layer 55 is provided therebetween. The second electrode 20a of the first layer is provided on the first substrate 51a side of the insulating layer 55, and the second electrode 20b of the second layer is provided on the first substrate 51b side of the insulating layer 55.

The ion conduction layer 30a of the first layer is provided between the first electrode 10a and the second electrode 20a, and the ion conduction layer 30b of the second layer is provided between the first electrode 10b and the second electrode 20b. Seal layers 59a and 59b are provided around the ion conduction layers 30a and 30b, respectively.

Thus, in the display device 420, the plurality of the active matrix optical layers 505 that include the optical cell 60a and the optical cell 60b having different optical characteristics are stacked, and thereby an expression range of the hue and brightness of the display colors can be expanded.

The insulating layer 55 mentioned above may be omitted, and the second electrode 20a of the first layer and the second electrode 20b of the second layer may be set at the same electric potential.

Furthermore, although the second electrode 20a is provided so as to face the first electrode 10a in this specific example, the second electrode 20a may face part of the first electrode 10a, or may not face the first electrode 10a.

For example, the second electrode 20a may be provided on the first substrate 51a. In this case, the first electrode 10a and the second electrode 20a may have the structure of an inter-digital electrode or a multi-finger electrode.

Furthermore, the second electrode 20b of the second layer may also be modified variously like the second electrode 20a of the first layer mentioned above.

Furthermore, although this specific example uses the case where two active matrix optical layers 505 are stacked, an optional number of the active matrix optical layers 505 may be stacked. For example, three active matrix optical layers 505 may be stacked.

Although this specific example is an example in which the active matrix optical layers 505 are stacked, the active matrix optical layer 505 may not be stacked. In this case, as illustrated in FIG. 24B, for example, the component optical layer 61 that includes a plurality of the optical cells 60 juxtaposed in the XY plane may be defined as one pixel, and this may be further juxtaposed in the XY plane.

(Fifth Embodiment)

Figure 27:
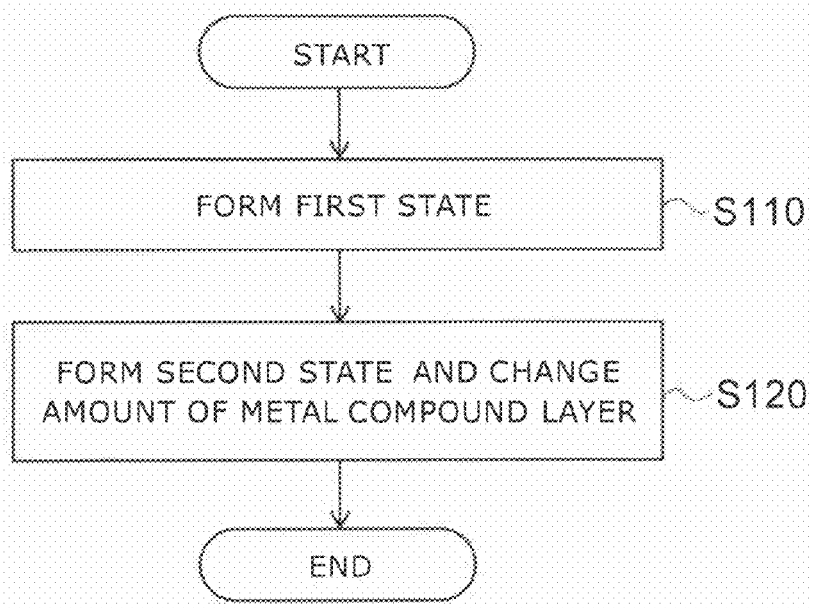
FIG. 27 is a flow chart illustrating a display method according to a fifth embodiment of the invention.

FIG. 27 is a flow chart illustrating a display method according to a fifth embodiment of the invention.

As illustrated in FIG. 27, the display method according to the fifth embodiment of the invention includes applying a first voltage V1 between a first electrode 10 and a second electrode 20 of an optical cell 60 to form a first state S1 (step S110). The optical cell 60 includes: the first electrode 10; the second electrode 20; an ion conduction layer 30 facing the first electrode 10 and the second electrode 20 and containing a mobile ion 31; and a nanostructure 40 electrically connected to the first electrode 10, provided between the first electrode 10 and the ion conduction layer 30, having a plasmon resonance wavelength in a visible region, and containing a metal element.

Then, a second voltage V2 different from the first voltage V1 is applied between the first electrode 10 and the second electrode 20 of the optical cell 60 to form a second state S2. The metal compound layer 50 is formed on at least part of a surface of the nanostructure 40 including a metal compound.

The metal compound layer 50 contains the metal element contained in the nanostructure 40, and has a refractive index different from a refractive index of the ion conduction layer 30. By applying at least one of the first voltage V1 and the second voltage V2, the amount of a metal compound layer 50 is changed between in the first state S1 and in the second state S2 (step S120).

That is, the amount of the metal compound layer 50 that is the metal compound formed on at least part of the surface of the nanostructure 40 by applying the voltage between the first electrode 10 and the second electrode 20 of the optical cell 60, contains the metal element contained in the nanostructure 40, and has the different refractive index from the ion conduction layer 30 is changed by changing the voltage applied between the first electrode 10 and the second electrode 20.

This can expand a shift amount of a plasmon resonance wavelength and provide a practical display method.

Hereinabove, embodiments of the invention are described with reference to specific examples. However, the invention is not limited to these examples. For example, one skilled in the art may appropriately select the shape, size, material, disposition relationship, and the like of components of the display device such as the electrode, the nanostructure, the metal compound, the metal compound layer, the mobile ion, the ion conduction layer, the substrate, and the switching element, and the manufacturing method from known art and similarly practice the invention; and such practice is included in the scope of the invention to the extent that similar effects thereto are obtained.

Further, any two or more components of the specific examples may be combined within the extent of technical feasibility. Such combination is included in the scope of the invention to the extent that the spirit of the invention is included.

Moreover, all display devices and display methods that can be obtained by an appropriate design modification by one skilled in the art based on the display device and the display method described above as embodiments of the invention also are within the scope of the invention to the extent that the spirit of the invention is included.

Furthermore, one skilled in the art may arrive at various alterations and modifications within the idea of the invention. Such alterations and modifications should be seen as within the scope of the invention.

The invention claimed is:

1. A display device comprising:
an optical cell including:
a first electrode;
a second electrode;
an ion conduction layer facing the first electrode and the second electrode and containing a mobile ion; and
a first nanostructure provided between the first electrode and the ion conduction layer, the first nanostructure being electrically connected to the first electrode, having a first plasmon resonance wavelength in a visible light region, and containing a first metal element,
a first metal compound layer containing the first metal element contained in the first nanostructure and having a refractive index different from a refractive index of the ion conduction layer, the first metal compound layer being formed on at least a part of a surface of the first nanostructure by applying a voltage between the first electrode and the second electrode, and
an amount of the first metal compound layer being different between in a first state and in a second state, a first voltage being applied between the first electrode and the second electrode in the first state, a second voltage different from the first voltage being applied between the first electrode and the second electrode in the second state.

2. The device according to claim 1, wherein the first metal element includes at least one selected from the group consisting of gold, silver, ruthenium, rhodium, palladium, osmium, iridium, platinum, copper, and cadmium selenide.

3. The device according to claim 1, wherein a volume average diameter of a plurality of nanostructure components of the first nanostructure is 20 nanometers or more and 100 nanometers or less.

4. The device according to claim 1, wherein an average of distance of closest approach among a plurality of nanostructure components of the first nanostructure is twice or more a volume average diameter of the plurality of the nanostructure components of the first nanostructure.

5. The device according to claim 1, wherein a size of a plurality of nanostructure components of the first nanostructure in a direction perpendicular to a major surface of the first electrode is not more than a size in a direction parallel to the major surface.

6. The device according to claim 1, wherein the mobile ion is an anion.

7. The device according to claim 1, wherein the first metal compound layer includes at least one of metal oxide, metal nitride, metal oxynitride, and metal sulfide containing the first metal element contained in the first nanostructure.

8. The device according to claim 1, wherein the second electrode is provided on an opposite side of the ion conduction layer to a side facing the first electrode.

9. The device according to claim 1, wherein a first major surface of the first electrode and a second major surface of the second electrode face each other and the ion conduction layer is provided between the first electrode and the second electrode.

10. The device according to claim 1, wherein the second electrode is provided on a side facing the first electrode of the ion conduction layer.

11. The device according to claim 1, wherein
the optical cell further includes a second nanostructure provided between the second electrode and the ion conduction layer, the second nanostructure being electrically connected to the second electrode, having a second plasmon resonance wavelength in a visible light region, and containing a second metal element,
a second metal compound layer containing the second metal element contained in the second nanostructure and having a refractive index different from a refractive index of the ion conduction layer is formed on at least a part of a surface of the second nanostructure by applying a voltage between the first electrode and the second electrode, and
an amount of the second metal compound layer is different between in a third state in which a third voltage is applied between the first electrode and the second electrode and in a fourth state in which a fourth voltage different from the third voltage is applied between the first electrode and the second electrode.

12. The device according to claim 1, wherein
the optical cell further includes a third nanostructure provided between the first electrode and the ion conduction layer, the third nanostructure being electrically connected to the first electrode, and containing a third metal element, the third nanostructure has a third plasmon resonance wavelength in a visible light region different from the first plasmon resonance wavelength,
a third metal compound layer is formed on at least a part of a surface of the third nanostructure by applying a voltage between the first electrode and the second electrode, the third metal compound layer contains the third metal element contained in the third nanostructure, a refractive index of the third metal compound layer is different from a refractive index of the ion conduction layer and also different from a refractive index of the first metal compound layer, and an amount of the third metal compound layer is different between in a fifth state in which a fifth voltage is applied between the first electrode and the second electrode and in a sixth state in which a sixth voltage different from the fifth voltage is applied between the first electrode and the second electrode.

13. The device according to claim 1, wherein
the device includes a plurality of the optical cells,
first major surfaces of the respective first electrodes of the plurality of the optical cells are parallel to each other, and
the plurality of the optical cells are stacked in a direction perpendicular to the first major surfaces.

14. The device according to claim 13, wherein the first plasmon resonance wavelengths of the respective first nanostructures of the plurality of the optical cells are different from each other.

15. The device according to claim 1, wherein
the device includes a plurality of the optical cells,
first major surfaces of the respective first electrodes of the plurality of the optical cells are parallel to each other, and
the plurality of the optical cells are juxtaposed in a plane parallel to the first major surfaces.

16. The device according to claim 15, wherein the first plasmon resonance wavelengths of the respective first nanostructures of the plurality of the optical cells are different from each other.

17. The device according to claim 1, wherein
the device includes an active matrix optical layer including:
a plurality of scanning lines extending in a first direction;
a plurality of signal lines extending in a second direction nonparallel to the first direction; and
a plurality of switching elements and a plurality of display components provided corresponding to an intersection of each of the plurality of scanning lines and each of the plurality of signal lines,
each of the plurality of the display components includes the optical cell, and one of the first electrode and the second electrode of the plurality of the optical cells is connected to each of the switching elements.

18. The device according to claim 17, wherein
the device includes a plurality of sub display components,
each of the plurality of the sub display components includes the plurality of the display components, and
the first plasmon resonance wavelengths of the respective first nanostructures of the optical cells of the display components in each of the plurality of the sub display components are different from each other.

19. The device according to claim 17, wherein
the device includes a plurality of the active matrix optical layers,
the plurality of the active matrix optical layers are stacked in a direction perpendicular to a plane including the first direction and the second direction, and
the first plasmon resonance wavelengths of the respective first nanostructures of the optical cells of the plurality of the display components of the plurality of the active matrix optical layers are different from each other.

20. A display method comprising:
changing an amount of a metal compound layer formed on at least a part of a surface of a nanostructure by changing a voltage applied between a first electrode and a second electrode of an optical cell,
the optical cell including:
the first electrode;
the second electrode;
an ion conduction layer facing the first electrode and the second electrode and containing a mobile ion; and
the nanostructure provided between the first electrode and the ion conduction layer, electrically connected to the first electrode, the nanostructure having a plasmon resonance wavelength in a visible light region, and containing a metal element,
the metal compound layer being formed by applying the voltage between the first electrode and the second electrode, the metal compound layer containing the metal element contained in the nanostructure, and having a refractive index different from a refractive index of the ion conduction layer.

* * * * *